(12) United States Patent
Van Phan et al.

(10) Patent No.: US 10,271,269 B2
(45) Date of Patent: Apr. 23, 2019

(54) CHANGES OF CLUSTER HEAD

(71) Applicant: NOKIA SOLUTIONS AND NETWORKS OY, Espoo (FI)

(72) Inventors: Vinh Van Phan, Oulu (FI); Ling Yu, Kauniainen (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 151 days.

(21) Appl. No.: 15/024,536

(22) PCT Filed: Oct. 30, 2013

(86) PCT No.: PCT/EP2013/072726
§ 371 (c)(1),
(2) Date: Mar. 24, 2016

(87) PCT Pub. No.: WO2015/043687
PCT Pub. Date: Apr. 2, 2015

(65) Prior Publication Data
US 2016/0242101 A1    Aug. 18, 2016

Related U.S. Application Data

(60) Provisional application No. 61/883,528, filed on Sep. 27, 2013.

(51) Int. Cl.
| | |
|---|---|
| *H04W 4/00* | (2018.01) |
| *H04W 48/14* | (2009.01) |
| *H04W 76/14* | (2018.01) |
| *H04W 4/80* | (2018.01) |
| *H04W 72/04* | (2009.01) |
| *H04W 4/08* | (2009.01) |
| *H04W 74/00* | (2009.01) |

(Continued)

(52) U.S. Cl.
CPC ............. *H04W 48/14* (2013.01); *H04W 4/08* (2013.01); *H04W 4/80* (2018.02); *H04W 24/02* (2013.01); *H04W 48/16* (2013.01); *H04W 48/20* (2013.01); *H04W 72/0453* (2013.01); *H04W 74/006* (2013.01); *H04W 74/04* (2013.01); *H04W 76/14* (2018.02); *H04W 48/12* (2013.01); *H04W 74/0808* (2013.01); *H04W 84/18* (2013.01); *H04W 84/20* (2013.01); *H04W 92/18* (2013.01)

(58) Field of Classification Search
CPC ................................ H04W 4/08; H04W 48/00
See application file for complete search history.

(56) References Cited

U.S. PATENT DOCUMENTS

| | | | |
|---|---|---|---|
| 5,850,592 A | 12/1998 | Ramanathan | |
| 2008/0159209 A1* | 7/2008 | Kim | H04W 72/0406 370/329 |

(Continued)

FOREIGN PATENT DOCUMENTS

| | | |
|---|---|---|
| EP | 1487155 A2 | 12/2004 |
| WO | 2009/104171 A2 | 8/2009 |

(Continued)

OTHER PUBLICATIONS

RP-131377; Vodafone, et al.; "Agreements from TSG RAN on work on Public Safety related use cases in Release 12"; TSG RAN Meeting #61; Sep. 3-6, 2013, Porto, Portugal.

(Continued)

*Primary Examiner* — Omoniyi Obayanju
(74) *Attorney, Agent, or Firm* — Brake Hughes Bellermann LLP

(57) ABSTRACT

It is provided a method, including: monitoring if a first cluster head of a first cluster of first communication devices has disappeared, wherein an apparatus performing the method has access to the first cluster enabling a device-to-device communication of the apparatus with at least one of the first communication devices; and, if it is monitored that the first cluster head has disappeared: detecting a second cluster head of a second cluster of second communication devices, wherein the second cluster head is different from the first cluster head, and the second cluster enables the device-to-device communication between at least two of the second communication devices; and requesting an access to the second cluster for the device-to-device communication.

13 Claims, 14 Drawing Sheets

(51) Int. Cl.
  *H04W 74/04* (2009.01)
  *H04W 24/02* (2009.01)
  *H04W 48/16* (2009.01)
  *H04W 48/20* (2009.01)
  *H04W 84/18* (2009.01)
  *H04W 84/20* (2009.01)
  *H04W 48/12* (2009.01)
  *H04W 92/18* (2009.01)
  *H04W 74/08* (2009.01)

(56) References Cited

U.S. PATENT DOCUMENTS

| | | | |
|---|---|---|---|
| 2008/0240145 A1 | 10/2008 | Adamovsky et al. | |
| 2014/0092833 A1* | 4/2014 | Vannithamby | H04W 52/0258 370/329 |
| 2016/0192176 A1* | 6/2016 | Zhu | H04W 8/005 370/329 |

FOREIGN PATENT DOCUMENTS

| | | |
|---|---|---|
| WO | 2015/044183 A1 | 4/2015 |
| WO | 2015/062642 A1 | 5/2015 |

OTHER PUBLICATIONS

International Search Report and Written Opinion for International Application No. PCT/EP2013/072726, dated Aug. 18, 2014, 21 pages.

\* cited by examiner

CHANGES OF CLUSTER HEAD

This application is a national stage entry of PCT Application No. PCT/EP2013/072726, filed Oct. 30, 2013, entitled "CHANGES OF CLUSTER HEAD", which claims priority to U.S. Application No. 61/883,528, filed Sep. 27, 2013, which are hereby incorporated by reference in their entireties.

BACKGROUND

Field

The present invention relates to apparatuses, methods, systems, computer programs, computer program products and computer-readable media usable for conducting device-to-device communication in a communication network.

Background Art

The following description of background art may include insights, discoveries, understandings or disclosures, or associations, together with disclosures not known to the relevant art prior, to at least some examples of embodiments of the present invention but provided by the invention. Some such contributions of the invention may be specifically pointed out below, whereas other such contributions of the invention will be apparent from their context.

The following meanings for the abbreviations used in this specification apply:
ARQ: automatic repeat request
CH: cluster head
CPU: central processing unit
D2D: device-to-device
E-UTRAN: evolved UMTS radio access network
eNB: evolved node B
HARQ: hybrid ARQ
HO: handover
ID: identifier
L1: layer 1 (physical layer)
L2: layer 2 (media access control layer)
LTE: Long Term Evolution
LTE-A: LTE Advanced
M2M: machine-to-machine
PHY: physical layer
ProSe: proximity services
RAN: radio access network
UE: user equipment
UMTS: universal mobile telecommunication system In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (Wi-MAX), took place all over the world.

Generally, for properly establishing and handling a communication connection between terminal devices such as a user device or user equipment (UE) and another communication network element or user device, a database, a server, host etc., one or more intermediate network elements such as communication network control elements, such as access points, base stations, control nodes, support nodes or service nodes are involved which may belong to different communication network.

So-called proximity based services (ProSe), which are also referred to as D2D (or machine-to-machine (M2M)) communications are expected to become a feature in future communications networks. ProSe are designed to provide an option to offload (cellular) communications system, reduce battery consumption and increase bit-rate, and hence also enable new services. ProSe is also an important part of communication requirements for Public Safety usage.

D2D communications may be implemented, for example, as an underlay to cellular networks, such as an LTE-Advanced network. One intention of D2D communication is to enable direct communication connection establishment between communication devices such as UEs, wherein "direct" means without involvement of an intermediate network element in between. D2D communication may be performed under a continuous network management and control and/or in cases where the communication devices are out of coverage of the cellular network.

SUMMARY

According to a first aspect of the invention, there is provided, for example, an apparatus, comprising at least one processor and at least one memory including a computer program code, the at least one memory and the computer program code configured to, with the at least one processor, cause the apparatus at least to:
 monitor if a first cluster head of a first cluster of first communication devices has disappeared, wherein the apparatus has access to the first cluster enabling a device-to-device communication of the apparatus with at least one of the first communication devices; and, if it is monitored that the first cluster head has disappeared:
 detect a second cluster head of a second cluster of second communication devices, wherein the second cluster head is different from the first cluster head, and the second cluster enables the device-to-device communication between at least two of the second communication devices; and request an access to the second cluster for the device-to-device communication.

In the apparatus, the at least one processor and the at least one memory may be further configured to cause to:
 check, if a first channel is not occupied in the second cluster, wherein the first channel is allocated to the device-to-device communication of the apparatus in the first cluster; and,
 if the first channel is not occupied in the second cluster, indicate the first channel to the second cluster head when requesting the access to the second cluster.

In the apparatus, the at least one processor and the at least one memory may be further configured to cause to:
 check, if a second channel is not occupied in the second cluster, wherein the second channel is allocated to the device-to-device communication of the apparatus in the first cluster; and,
 if the second channel is occupied in the second cluster, prevent the apparatus from requesting the access to the second cluster.

In the apparatus, the at least one processor and the at least one memory may be further configured to cause to
 evaluate if a fourth channel different from a third channel is sufficient for the device-to-device communication, wherein the third channel is allocated to the device-to-device communication of the apparatus in the first cluster, and the fourth channel is assigned to the device-to-device communication of the apparatus in an assignment received from the second cluster head; and, if the fourth channel is not sufficient for the device-to-device communication of the apparatus, prevent the apparatus from requesting the access to the second cluster.

In the apparatus, the at least one processor and the at least one memory may be further configured to cause to:

configure the apparatus to act as a third cluster head of a third cluster of third communication devices, or request a replacement communication device of the first communication devices and different from the apparatus to act as the third cluster head of the third cluster, wherein in the third cluster, a fifth channel is allocated to the device-to-device communication of the apparatus, and the fifth channel is allocated to the device-to-device communication of the apparatus in the first cluster.

In the apparatus, the at least one processor and the at least one memory may be further configured to cause to, if the apparatus is configured to act as the third cluster head, notify at least one of the first communication devices of the apparatus being configured to act as the third cluster head replacing the first cluster head.

In the apparatus, the monitoring if the first cluster head has disappeared may comprise monitoring if an information indicating that the first cluster head has disappeared is received; and the at least one processor and the at least one memory may be further configured to cause to consider that the first cluster head has disappeared if the information is received.

In the apparatus, the monitoring if the first cluster head has disappeared may comprise monitoring if at least one of an operative status information signal and a broadcast control channel has been received from the first cluster head within a respective predefined period of time; and the at least one processor and the at least one memory may be further configured to cause to:

consider that the first cluster head has disappeared if the at least one of the monitored operative status information signal and the monitored broadcast control channel has not been received within the respective predefined period of time.

According to a second aspect of the invention, there is provided an apparatus, comprising at least one processor and at least one memory including a computer program code, the at least one memory and the computer program code configured to, with the at least one processor, cause the apparatus at least to:

check if a first channel may be assigned to a device-to-device communication of a first communication device, wherein the first channel is indicated in a request to access to a cluster of second communication devices, the cluster enables a device-to-device communication of the apparatus with at least one of the second communication devices, the second communication devices are different from the first communication device, the request is received from the first communication device, and the apparatus acts as a cluster head of the cluster; and, if the first channel may be assigned to the device-to-device communication of the first communication device:

accept the request of the first communication device to access to the cluster; and allocate the first channel to the device-to-device communication of the first communication device in the cluster.

In the apparatus, the at least one processor and the at least one memory may be further configured to cause to, if the first channel may not be assigned to the device-to-device communication of the first communication device:

check if the request is received on a second channel different from the first channel; and, if the request is received on the second channel:

accept the request to access to of the cluster; and allocate the second channel to the device-to-device communication of the first communication device.

According to a third aspect of the invention, there is provided an apparatus, comprising at least one processor and at least one memory including a computer program code, the at least one memory and the computer program code configured to, with the at least one processor, cause the apparatus at least to, check if the apparatus acts as a cluster head of a cluster of communication devices, wherein the cluster enables a device-to-device communication between the apparatus and at least one of the communication devices, and, if the apparatus acts as the cluster head:

instruct a first communication device of the communication devices to be a candidate for acting as the cluster head of the cluster for a case that the apparatus ceases to act as the cluster head of the cluster, wherein the first communication device is different from the apparatus.

In the apparatus, the at least one processor and the at least one memory may be further configured to cause to:

inform a second communication device of the communication devices on the first member acting as the candidate.

According to a fourth aspect of the invention, there is provided an apparatus, comprising at least one processor and at least one memory including a computer program code, the at least one memory and the computer program code configured to, with the at least one processor, cause the apparatus at least to:

detect if an instruction is received to be a candidate for acting as a cluster head of a cluster of communication devices for a case that a communication device acting as the cluster head of the cluster disappears, wherein the apparatus has an access to the cluster of the cluster head, and the cluster enables a device-to-device communication between the apparatus and at least one of the communication devices; and, if the instruction is detected, monitor if the cluster head has disappeared; and, if it is monitored that the cluster head has disappeared, configure the apparatus to act as the cluster head of the cluster.

In the apparatus, the at least one processor and the at least one memory may be further configured to cause to, if the instruction is detected:

allocate and schedule a resource for the device-to-device communication based on an allocation and scheduling information received from the cluster head.

In the apparatus, the monitoring if the cluster head has disappeared may comprise monitoring if a disappearance message is received from the cluster head; and wherein the at least one processor and the at least one memory may be further configured to cause to consider that the cluster head has disappeared if the disappearance message is received.

In the apparatus, the monitoring if the first cluster head has disappeared may comprise monitoring if an information indicating that the first cluster head has disappeared is received; and the at least one processor and the at least one memory are further configured to cause to:

consider that the cluster head has disappeared if the information is received.

In the apparatus, the monitoring if the first cluster head has disappeared may comprise monitoring if at least one of an operative status information signal and a broadcast control channel has been received from the communication device acting as the cluster head within a respective predefined period of time; and the at least one processor and the at least one memory may be further configured to cause to:

consider that the cluster head has disappeared if the at least one of the operative status information signal and the broadcast control channel has not been received within the respective predefined period of time.

According to a fifth aspect of the invention, there is provided an apparatus, comprising at least one processor and at least one memory including a computer program code, the at least one memory and the computer program code configured to, with the at least one processor, cause the apparatus at least to:

monitor if an instruction to act as a new cluster head is received from a first cluster head of a cluster of communication devices, wherein the apparatus has an access to the cluster, and the cluster enables a device-to-device communication between the apparatus and at least one of the communication devices; and, if the instruction is received:

configure the apparatus to act as the new cluster head of the cluster.

In the apparatus, the at least one processor and the at least one memory may be further configured to cause to, if the instruction is detected:

allocate and schedule a resource for the device-to-device communication based on an allocation and scheduling information received from the first cluster head.

According to a sixth aspect of the invention, there is provided an apparatus, comprising at least one processor and at least one memory including a computer program code, the at least one memory and the computer program code configured to, with the at least one processor, cause the apparatus at least to:

monitor if a cluster head of a cluster of communication devices has disappeared, wherein the apparatus has access to the cluster, and the cluster enables a device-to-device communication of the apparatus with at least one of the communication devices; and, if it is monitored that the cluster head has disappeared:

act as the cluster head of the cluster.

In the apparatus, the at least one processor and the at least one memory may be further configured to cause to, if the apparatus acts as the cluster head:

allocate a channel to the device-to-device communication of the apparatus, wherein the channel was allocated by the disappeared cluster head for the device-to-device communication of the apparatus.

In the apparatus, the monitoring if the cluster head has disappeared may comprise monitoring if an information indicating that the cluster head has disappeared is received; and the at least one processor and the at least one memory may be further configured to cause to:

consider that the cluster head has disappeared if the information is received.

In the apparatus, the monitoring if the cluster head has disappeared may comprise monitoring if at least one of an operative status information signal and a broadcast control channel has been received from the cluster head within a respective predefined period of time; and the at least one processor and the at least one memory may be further configured to cause to:

consider that the cluster head has disappeared if the at least one of the operative status information signal and the broadcast control channel has not been received within the respective predefined period of time.

According to a seventh aspect of the invention, there is provided an apparatus, comprising at least one processor and at least one memory including a computer program code, the at least one memory and the computer program code configured to, with the at least one processor, cause the apparatus at least to:

detect if the apparatus acts as a cluster head for a device-communication for a cluster of communication devices, wherein the cluster enables a device-to-device communication between the apparatus and at least one of the communication devices;

if it is detected that the apparatus acts as the cluster head, monitor if a condition is met, wherein the apparatus is expected to disappear from acting as the cluster head of the cluster if the condition is met;

if it is monitored that the condition is met, indicate that the apparatus will disappear from acting as the cluster head; and then inhibit the apparatus from acting as the cluster head.

In the apparatus, the condition may be met if a battery level of the apparatus is lower than a battery threshold and/or if the apparatus moves more than a movement threshold.

In the apparatus, the at least one processor and the at least one memory may be further configured to cause to:

if it is monitored that the apparatus will disappear from acting as the cluster head: instruct a first communication device of the communication devices different from the apparatus to act as the cluster head.

According to an eighth aspect of the invention, there is provided an apparatus, comprising at least one processor and at least one memory including a computer program code, the at least one memory and the computer program code configured to, with the at least one processor, cause the apparatus at least to:

perform a device-to-device communication with a partner communication device of first communication devices in a first cluster of the first communication devices with a first cluster head, wherein the first cluster enables the device-to-device communication between the apparatus and at least the partner communication device;

monitor if the apparatus gets an access to a second cluster of second communication devices with a second cluster head instead of the first cluster of the first cluster head, wherein the second cluster head is different from the first cluster head, and the second cluster enables the device-to-device communication between at least two of the second communication devices; and, if it monitored that the apparatus gets the access to the second cluster:

continue the device-to-device communication with the partner communication device in the second cluster.

In the apparatus, the at least one processor and the at least one memory may be further configured to cause to, if it is monitored that the apparatus gets the access to the second cluster:

check if the partner communication device has the access to the second cluster; and, if the partner communication device does not have the access to the second cluster, inhibit the apparatus from continuing the device-to-device communication with the partner communication device.

In the apparatus, the at least one processor and the at least one memory may be further configured to cause to, if it is monitored that the apparatus gets the access to the second cluster:
check if the partner communication device has the access to the second cluster; and, if the partner communication device does not have the access to the second cluster:
check if the partner communication device has an access to a third cluster of third communication devices with an inter-cluster relationship established to the second cluster, wherein the third cluster enables the device-to-device communication between at least two of the third communication devices; and,
if the inter-cluster relationship is established, continue the device-to-device communication with the partner communication device based on the inter-cluster relationship.

In the apparatus, the at least one processor and the at least one memory may be further configured to cause to, if it is monitored that the apparatus gets the access to the second cluster:
check if the partner communication device has the access to the second cluster; and, if the partner communication device does not have the access to the second cluster:
check if a third cluster head of a third cluster of third communication devices is detected, wherein the partner communication device has access to the third cluster, and the third cluster enables the device-to-device communication between at least two of the third communication devices; and, if the third cluster head is detected:
access the third cluster; and
continue the device-to-device communication with the partner communication
device in the third cluster.

In the apparatus, the at least one processor and the at least one memory may be further configured to cause to:
if the apparatus accesses the third cluster, leave the second cluster.

In the apparatus, the first cluster and the second cluster may be the same.

In the apparatus, the monitoring if the first cluster head has disappeared may comprise monitoring if an information indicating that the first cluster head has disappeared is received; and the at least one processor and the at least one memory may be further configured to cause to: consider that the first cluster head has disappeared if the information is received.

In the apparatus, the monitoring if the first cluster head has disappeared may comprises monitoring if at least one of an operative status information signal and a broadcast control channel has been received from the first cluster head within a respective predefined period of time; and the at least one processor and the at least one memory may be further configured to cause to:
consider that the first cluster head has disappeared if the at least one of the operative status information signal and the broadcast control channel has not been received within the respective predefined period of time.

According to a ninth aspect of the invention, there is provided an apparatus, comprising at least one processor and at least one memory including a computer program code, the at least one memory and the computer program code configured to, with the at least one processor, cause the apparatus at least to:

check if the apparatus acts as a cluster head of a cluster of communication devices, wherein the cluster enables a device-to-device communication between the apparatus and at least one of the communication devices; and
broadcast periodically an operative status information signal if the apparatus acts as the cluster head; and
inhibit the apparatus from broadcasting the operative status information signal if the apparatus does not act as the cluster head.

According to a tenth aspect of the invention, there is provided an apparatus, comprising:
monitoring means adapted to monitor if a first cluster head of a first cluster of first communication devices has disappeared, wherein an apparatus performing the method has access to the first cluster enabling a device-to-device communication of the apparatus with at least one of the first communication devices;
detecting means adapted to detect, if it is monitored that the first cluster head has disappeared, a second cluster head of a second cluster of second communication devices, wherein the second cluster head is different from the first cluster head, and the second cluster enables the device-to-device communication between at least two of the second communication devices; and
requesting means adapted to request an access to the second cluster for the device-to-device communication.

According to an eleventh aspect of the invention, there is provided an apparatus, comprising:
checking means adapted to check if a first channel may be assigned to a device-to-device communication of a first communication device, wherein the first channel is indicated in a request to access to a cluster of second communication devices, the cluster enables a device-to-device communication of an apparatus performing the method with at least one of the second communication devices, the second communication devices are different from the first communication device, the request is received from the first communication device, and the apparatus acts as a cluster head of the cluster;
accepting means adapted to accept, if the first channel may be assigned to the device-to-device communication of the first communication device, the request of the first communication device to access to the cluster; and
allocating means adapted to allocate the first channel to the device-to-device communication of the first communication device in the cluster.

According to a twelfth aspect of the invention, there is provided an apparatus, comprising:
checking means adapted to check if an apparatus performing the method acts as a cluster head of a cluster of communication devices, wherein the cluster enables a device-to-device communication between the apparatus and at least one of the communication devices;
instructing means adapted to instruct, if the apparatus acts as the cluster head, a first communication device of the communication devices to be a candidate for acting as the cluster head of the cluster for a case that the apparatus ceases to act as the cluster head of the cluster, wherein the first communication device is different from the apparatus.

According to a thirteenth aspect of the invention, there is provided an apparatus, comprising:
detecting means adapted to detect if an instruction is received to be a candidate for acting as a cluster head of a cluster of communication devices for a case that a communication device acting as the cluster head of the cluster disappears, wherein an apparatus performing the method has an access to the cluster of the cluster head, and the cluster enables a device-to-device communication between the apparatus and at least one of the communication devices;

monitoring means adapted to monitor, if the instruction is detected, if the cluster head has disappeared; and, configuring means adapted to configure, if it is monitored that the cluster head has disappeared, the apparatus to act as the cluster head of the cluster.

According to fourteenth aspect of the invention, there is provided an apparatus, comprising:

monitoring means adapted to monitor if an instruction to act as a new cluster head is received from a first cluster head of a cluster of communication devices, wherein an apparatus performing the method has an access to the cluster, and the cluster enables a device-to-device communication between the apparatus and at least one of the communication devices; and configuring means adapted to configure, if the instruction is received, the apparatus to act as the new cluster head of the cluster.

According to a fifteenth aspect of the invention, there is provided an apparatus, comprising:

monitoring means adapted to monitor if a cluster head of a cluster of communication devices has disappeared, wherein an apparatus performing the method has access to the cluster, and the cluster enables a device-to-device communication of the apparatus with at least one of the communication devices; and acting means adapted to act, if it is monitored that the cluster head has disappeared, as the cluster head of the cluster.

According to a sixteenth aspect of the invention, there is provided an apparatus, comprising:

detecting means adapted to detect if an apparatus performing the method acts as a cluster head for a device-communication for a cluster of communication devices, wherein the cluster enables a device-to-device communication between the apparatus and at least one of the communication devices;

monitoring means adapted to monitor, if it is detected that the apparatus acts as the cluster head, if a condition is met, wherein the apparatus is expected to disappear from acting as the cluster head of the cluster if the condition is met;

indicating means adapted to indicate, if it is monitored that the condition is met, that the apparatus will disappear from acting as the cluster head; and inhibiting means adapted to inhibit the apparatus from acting as the cluster head after the indication.

According to a seventeenth aspect of the invention, there is provided an apparatus, comprising:

performing means adapted to perform a device-to-device communication with a partner communication device of first communication devices in a first cluster of the first communication devices with a first cluster head, wherein the first cluster enables the device-to-device communication between an apparatus performing the method and at least the partner communication device;

monitoring means adapted to monitor if the apparatus gets an access to a second cluster of second communication devices with a second cluster head instead of the first cluster of the first cluster head, wherein the second cluster head is different from the first cluster head, and the second cluster enables the device-to-device communication between at least two of the second communication devices; and continuing means adapted to continue, if it monitored that the apparatus gets the access to the second cluster, the device-to-device communication with the partner communication device in the second cluster.

According to a eighteenth aspect of the invention, there is provided an apparatus, comprising:

checking means adapted to check if an apparatus performing the method acts as a cluster head of a cluster of communication devices, wherein the cluster enables a device-to-device communication between the apparatus and at least one of the communication devices;

broadcasting means adapted to broadcast periodically an operative status information signal if the apparatus acts as the cluster head; and inhibiting means adapted to inhibit the apparatus from broadcasting the operative status information signal if the apparatus does not act as the cluster head.

According to a nineteenth aspect of the invention, there is provided a method, comprising:

monitoring if a first cluster head of a first cluster of first communication devices has disappeared, wherein an apparatus performing the method has access to the first cluster enabling a device-to-device communication of the apparatus with at least one of the first communication devices; and, if it is monitored that the first cluster head has disappeared:

detecting a second cluster head of a second cluster of second communication devices, wherein the second cluster head is different from the first cluster head, and the second cluster enables the device-to-device communication between at least two of the second communication devices; and requesting an access to the second cluster for the device-to-device communication.

The method may further comprise:

checking, if a first channel is not occupied in the second cluster, wherein the first channel is allocated to the device-to-device communication of the apparatus in the first cluster; and, if the first channel is not occupied in the second cluster, indicating the first channel to the second cluster head when requesting the access to the second cluster.

The method may further comprise:

checking, if a second channel is not occupied in the second cluster, wherein the second channel is allocated to the device-to-device communication of the apparatus in the first cluster; and, if the second channel is occupied in the second cluster, preventing the apparatus from requesting the access to the second cluster.

The method may further comprise:

evaluating if a fourth channel different from a third channel is sufficient for the device-to-device communication, wherein the third channel is allocated to the device-to-device communication of the apparatus in the first cluster, and the fourth channel is assigned to the device-to-device communication of the apparatus in an assignment received from the second cluster head; and, if the fourth channel is not sufficient for the device-to-device communication of the apparatus, preventing the apparatus from requesting the access to the second cluster.

The method may further comprise:
  configuring the apparatus to act as a third cluster head of a third cluster of third communication devices, or
  requesting a replacement communication device of the first communication devices and different from the apparatus to act as the third cluster head of the third cluster, wherein
  in the third cluster, a fifth channel is allocated to the device-to-device communication of the apparatus, and the fifth channel is allocated to the device-to-device communication of the apparatus in the first cluster.

The method may further comprise, if the apparatus is configured to act as the third cluster head,
  notifying at least one of the first communication devices of the apparatus being configured to act as the third cluster head replacing the first cluster head.

In the method, the monitoring if the first cluster head has disappeared may comprise monitoring if an information indicating that the first cluster head has disappeared is received; and the method may further comprise considering that the first cluster head has disappeared if the information is received.

In the method, the monitoring if the first cluster head has disappeared may comprise monitoring if at least one of an operative status information signal and a broadcast control channel has been received from the first cluster head within a respective predefined period of time; and the method may further comprise considering that the first cluster head has disappeared if the at least one of the monitored operative status information signal and the monitored broadcast control channel has not been received within the respective predefined period of time.

According to a twentieth aspect of the invention, there is provided a method, comprising:
  checking if a first channel may be assigned to a device-to-device communication of a first communication device, wherein the first channel is indicated in a request to access to a cluster of second communication devices, the cluster enables a device-to-device communication of an apparatus performing the method with at least one of the second communication devices, the second communication devices are different from the first communication device, the request is received from the first communication device, and the apparatus acts as a cluster head of the cluster; and, if the first channel may be assigned to the device-to-device communication of the first communication device:
  accepting the request of the first communication device to access to the cluster; and
  allocating the first channel to the device-to-device communication of the first communication device in the cluster.

The method may further comprise, if the first channel may not be assigned to the device-to-device communication of the first communication device:
  checking if the request is received on a second channel different from the first channel; and, if the request is received on the second channel:
  accepting the request to access to of the cluster; and
  allocating the second channel to the device-to-device communication of the first communication device.

According to a twenty-first aspect of the invention, there is provided a method, comprising checking if an apparatus performing the method acts as a cluster head of a cluster of communication devices, wherein the cluster enables a device-to-device communication between the apparatus and at least one of the communication devices; and, if the apparatus acts as the cluster head:
  instructing a first communication device of the communication devices to be a candidate for acting as the cluster head of the cluster for a case that the apparatus ceases to act as the cluster head of the cluster, wherein the first communication device is different from the apparatus.

The method may further comprise:
  informing a second communication device of the communication devices on the first member acting as the candidate.

According to a twenty-second aspect of the invention, there is provided a method, comprising:
  detecting if an instruction is received to be a candidate for acting as a cluster head of a cluster of communication devices for a case that a communication device acting as the cluster head of the cluster disappears, wherein an apparatus performing the method has an access to the cluster of the cluster head, and the cluster enables a device-to-device communication between the apparatus and at least one of the communication devices; and,
  if the instruction is detected, monitoring if the cluster head has disappeared; and,
  if it is monitored that the cluster head has disappeared, configuring the apparatus to act as the cluster head of the cluster.

The method may further comprise, if the instruction is detected:
  allocating and scheduling a resource for the device-to-device communication based on an allocation and scheduling information received from the cluster head.

In the method, the monitoring if the cluster head has disappeared may comprise monitoring if a disappearance message is received from the cluster head; and the method may further comprise considering that the cluster head has disappeared if the disappearance message is received.

In the method, the monitoring if the first cluster head has disappeared may comprise monitoring if information indicating that the first cluster head has disappeared is received; and the method may further comprise:
  considering that the cluster head has disappeared if the information is received.

In the method, the monitoring if the first cluster head has disappeared may comprise monitoring if at least one of an operative status information signal and a broadcast control channel has been received from the communication device acting as the cluster head within a respective predefined period of time; and the method may further comprise:
  considering that the cluster head has disappeared if the at least one of the operative status information signal and the broadcast control channel has not been received within the respective predefined period of time.

According to a twenty-third aspect of the invention, there is provided a method, comprising:
  monitoring if an instruction to act as a new cluster head is received from a first cluster head of a cluster of communication devices, wherein an apparatus performing the method has an access to the cluster, and the cluster enables a device-to-device communication between the apparatus and at least one of the communication devices; and, if the instruction is received:
  configuring the apparatus to act as the new cluster head of the cluster.

The method may further comprise, if the instruction is detected:

allocating and scheduling a resource for the device-to-device communication based on an allocation and scheduling information received from the first cluster head.

According to a twenty-fourth aspect of the invention, there is provided a method, comprising:

monitoring if a cluster head of a cluster of communication devices has disappeared, wherein an apparatus performing the method has access to the cluster, and the cluster enables a device-to-device communication of the apparatus with at least one of the communication devices; and, if it is monitored that the cluster head has disappeared:

acting as the cluster head of the cluster.

The method may further comprise, if the apparatus acts as the cluster head:

allocating a channel to the device-to-device communication of the apparatus, wherein the channel was allocated by the disappeared cluster head for the device-to-device communication of the apparatus.

In the method, the monitoring if the cluster head has disappeared may comprise monitoring if an information indicating that the cluster head has disappeared is received; and the method may further comprise:

considering that the cluster head has disappeared if the information is received.

In the method, the monitoring if the cluster head has disappeared may comprise monitoring if at least one of an operative status information signal and a broadcast control channel has been received from the cluster head within a respective predefined period of time; and the method may further comprise:

considering that the cluster head has disappeared if the at least one of the operative status information signal and the broadcast control channel has not been received within the respective predefined period of time.

According to a twenty-fifth embodiment of the invention, there is provided a method, comprising:

detecting if an apparatus performing the method acts as a cluster head for a device-communication for a cluster of communication devices, wherein the cluster enables a device-to-device communication between the apparatus and at least one of the communication devices;

if it is detected that the apparatus acts as the cluster head, monitoring if a condition is met, wherein the apparatus is expected to disappear from acting as the cluster head of the cluster if the condition is met;

if it is monitored that the condition is met, indicating that the apparatus will disappear from acting as the cluster head; and then inhibiting the apparatus from acting as the cluster head.

In the method, the condition may be met if a battery level of the apparatus is lower than a battery threshold and/or if the apparatus moves more than a movement threshold.

The method may further comprise:

if it is monitored that the apparatus will disappear from acting as the cluster head: instructing a first communication device of the communication devices different from the apparatus to act as the cluster head.

According to a twenty-sixth aspect of the invention, there is provided a method, comprising:

performing a device-to-device communication with a partner communication device of first communication devices in a first cluster of the first communication devices with a first cluster head, wherein the first cluster enables the device-to-device communication between an apparatus performing the method and at least the partner communication device;

monitoring if the apparatus gets an access to a second cluster of second communication devices with a second cluster head instead of the first cluster of the first cluster head, wherein the second cluster head is different from the first cluster head, and the second cluster enables the device-to-device communication between at least two of the second communication devices; and, if it is monitored that the apparatus gets the access to the second cluster:

continuing the device-to-device communication with the partner communication device in the second cluster.

The method may further comprise, if it is monitored that the apparatus gets the access to the second cluster:

checking if the partner communication device has the access to the second cluster; and, if the partner communication device does not have the access to the second cluster, inhibiting the apparatus from continuing the device-to-device communication with the partner communication device.

The method may further comprise, if it is monitored that the apparatus gets the access to the second cluster:

checking if the partner communication device has the access to the second cluster; and, if the partner communication device does not have the access to the second cluster:

checking if the partner communication device has an access to a third cluster of third communication devices with an inter-cluster relationship established to the second cluster, wherein the third cluster enables the device-to-device communication between at least two of the third communication devices; and, if the inter-cluster relationship is established, continuing the device-to-device communication with the partner communication device based on the inter-cluster relationship.

The method may further comprise, if it is monitored that the apparatus gets the access to the second cluster:

checking if the partner communication device has the access to the second cluster; and, if the partner communication device does not have the access to the second cluster:

checking if a third cluster head of a third cluster of third communication devices is detected, wherein the partner communication device has access to the third cluster, and the third cluster enables the device-to-device communication between at least two of the third communication devices; and, if the third cluster head is detected:

accessing the third cluster; and continuing the device-to-device communication with the partner communication device in the third cluster.

The method may further comprise:

if the apparatus accesses the third cluster, leaving the second cluster.

In the method, the first cluster and the second cluster may be the same.

In the method, the monitoring if the first cluster head has disappeared may comprise monitoring if information indicating that the first cluster head has disappeared is received; and the method may further comprise considering that the first cluster head has disappeared if the information is received.

In the method, the monitoring if the first cluster head has disappeared may comprise monitoring if at least one of an operative status information signal and a broadcast control channel has been received from the first cluster head within a respective predefined period of time; and the method may further comprise:

considering that the first cluster head has disappeared if the at least one of the operative status information signal and the broadcast control channel has not been received within the respective predefined period of time.

According to a twenty-seventh aspect of the invention, there is provided a method, comprising:

checking if an apparatus performing the method acts as a cluster head of a cluster of communication devices, wherein the cluster enables a device-to-device communication between the apparatus and at least one of the communication devices; and broadcasting periodically an operative status information signal if the apparatus acts as the cluster head; and inhibiting the apparatus from broadcasting the operative status information signal if the apparatus does not act as the cluster head.

Each of the methods of the nineteenth to twenty-seventh aspects may be a method of cluster head change.

According to a twenty-eighth aspect of the invention, there is provided a computer program product for a computer, comprising software code portions for performing the steps of any of the methods of the nineteenth to twenty-seventh aspects when said product is run on the computer. The computer program product may comprises a computer-readable medium on which said software code portions are stored, and/or the computer program product may be directly loadable into the internal memory of the computer and/or transmittable via a network by means of at least one of upload, download and push procedures.

According to some embodiments of the invention, at least one of the following advantages may be achieved:

D2D communication is made more robust;
the solution is simple to implement;
few or even no additional signaling is required; and
D2D communication may be continued even if the cluster head disappears, thus enabling seamless user experience.

It is to be understood that above modifications may be applied singly or in combination to the respective aspects which they refer to.

BRIEF DESCRIPTION OF THE DRAWINGS

Some embodiments of the present invention are described below, by way of example only, with reference to the accompanying drawings, in which:

FIG. 16 shows a method according to an embodiment of the invention;

DESCRIPTION OF EMBODIMENTS

Figure 1:
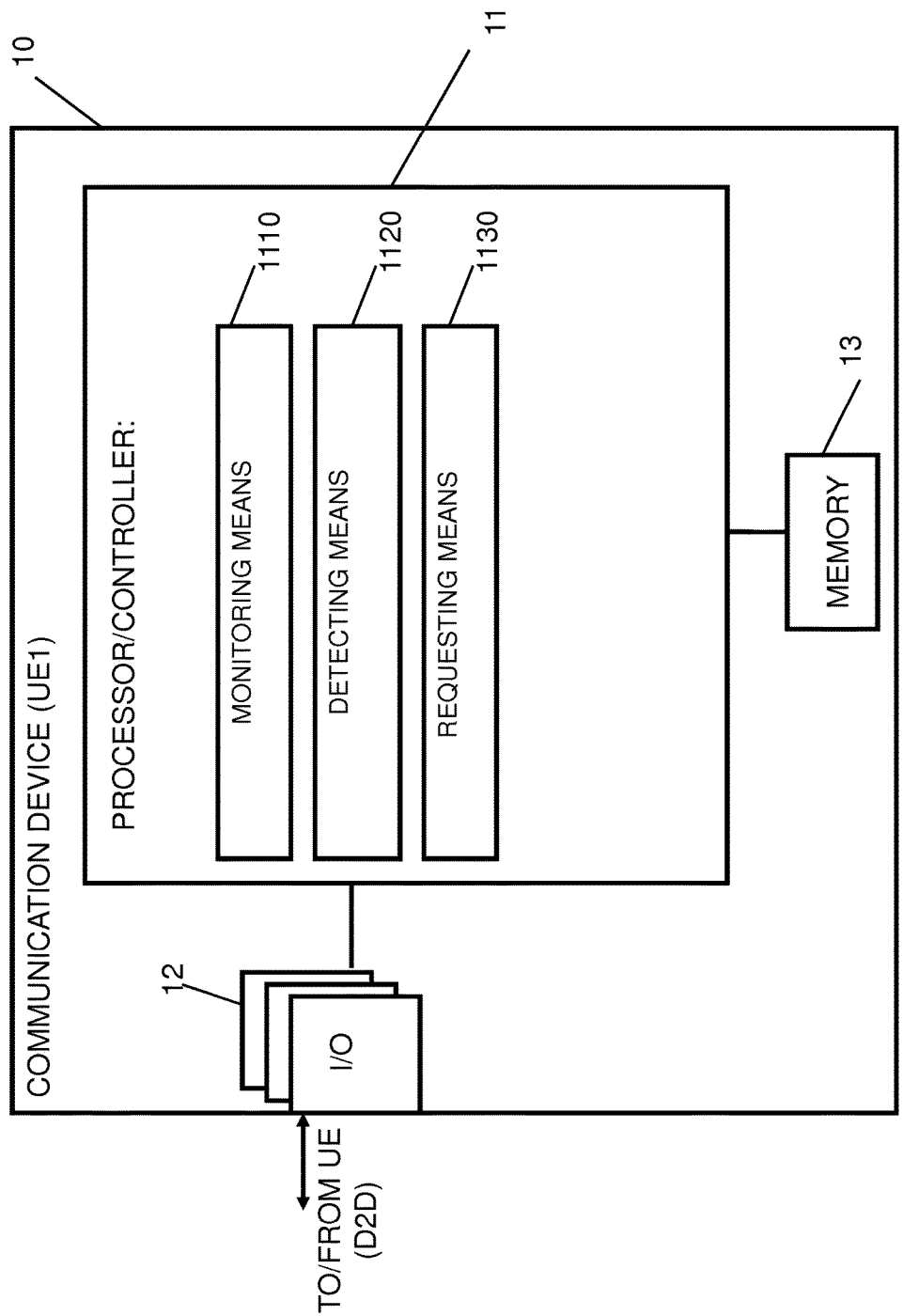
FIG. 1 shows an apparatus according to an embodiment of the invention.

In the following, some embodiments are described with reference to the drawings. In the following, different exemplifying examples will be described using, as an example of a communication network, a cellular wireless communication network, such as an LTE or LTE-Advanced based system. However, it is to be noted that the present invention is not limited to an application using such types of communication system, but is also applicable in other types of communication systems, be it wireless systems, wired systems or systems using a combination thereof.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

A basic system architecture of a communication system, where example versions and embodiments are applicable, may comprise one or more communication networks comprising a wired or wireless access network subsystem and a core network. Such an architecture may comprise one or more communication network control elements, access network elements, radio access network elements, access service network gateways or base transceiver stations, such as a base station or an eNB, which control a respective coverage area or cell and with which one or more communication devices, communication elements, or terminal devices such as a UE or another device having a similar function, such as a modem chipset, a chip, a module etc., which may also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described devices and elements, which also depend on the actual network type, are known to those skilled in the art and described in corresponding specifications, so that a detailed description thereof is omitted herein. However, it is to be noted that several additional network elements and signaling links may be employed for a communication of a communication device besides those described in detail herein below.

The communication network may also be able to communicate with other networks, such as a public switched telephone network or the Internet. The communication network may also be able to support the usage of cloud services. It should be appreciated that a base station and/or eNBs or their functionalities may be implemented by using any node, host, server or access node etc. entity suitable for such a usage.

Furthermore, the described network elements, such as terminal devices, communication devices, or user devices like user equipment (UE), communication network control elements, like a base station, eNB, host or server, and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, may be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to example versions of the disclosure, a communication device such as a UE may have implemented also mechanisms allowing to provide proximity based services (ProSe), i.e. to conduct D2D communications. For example, the communication devices may be configured to participate in a broadcast D2D communication either as a transmitter and/or as a receiver of broadcast communications.

Broadcast D2D communication are usable, for example, in public safety use cases where D2D broadcast communication may be extended to support group communication which is fundamental to public safety operation. Another option is to apply D2D communications in commercial use cases, such as advertising. D2D is considered to be used mainly in short range applications, such as providing local services. Therefore, it is possible to reuse resources used e.g. for broadcast channels at a different location.

In one control scheme for managing D2D communications, a cellular network may establish a radio bearer dedicated for D2D communications and stay in control of session setup and radio resources without routing user plane traffic. In such network-controlled D2D communications, UEs may have both cellular bearers (at least some default signaling bearers for network control purposes) and D2D bearers configured, thus they may have a "mixed" configuration. The user devices may be configured to switch between communicating with a serving communication network control element, such as an eNB, in a regular cellular access mode (on a cellular radio bearer) and directly with each other in a D2D mode (on a D2D radio bearer), e.g. in a time-division or time-sharing fashion.

In another control scheme, the communication devices may be out of coverage of the network. Hence, the communication devices may be in a D2D mode only.

In both the "mixed" configuration case and the out of coverage case described above, clusters may be utilized in order to reduce signaling: in the mixed case, a communication network control element, such as an eNB, may allocate resources for a cluster, and a cluster head or master device may further allocate them to cluster members. In the out of coverage case, the cluster head may allocate resources which are previously assigned to D2D communication. The previous assignment may be done by a communication network control element, and/or some resources may be predefined in the communication device for D2D communication in the out of coverage case. It should be understood that acting as a cluster head may require node-like operation from a UE or server. Clusters may also be flexible and thus alter according to needs and/or time. User devices may enter and leave a cluster when they move from one coverage area to another, for example. Furthermore, cluster heads may act as a relay for UEs being out of coverage.

The contributions of the last RAN1#74 and RAN2#83 meetings have shown that the star-topology D2D cluster, which is supervised by a central device referred to as the cluster head (CH), is a preferable option for supporting ProSe D2D communications.

The outcomes of RAN1#74 meeting include agreement as follows:
 For PHY broadcast which is used for unicast and groupcast as well, the baseline is no PHY close-loop feedback, i.e. no HARQ, power control etc.
 For higher layer, unicast & groupcast need to be supported, but only broadcast is supported on the physical layer.
 ARQ support in L2 may be possible.

Hence, there is a need of a comprehensive concept how to facilitate robust D2D communications on top of such broadcast based L1.

Some embodiments of the invention provide a simple and robust solution with minimized signalling and processing overhead. Focusing on reliability and robustness of L1 broadcast based 1:M (1 to many) D2D cluster communications, for example solutions to the following particular challenges are provided:
 1. To enable cluster members to cope with possible changes of the current CH; and
 2. To enable simple and effective direct communication between members of different clusters even in case of a change of the CH.

In this application, it is assumed that CH is configured (by itself in autonomous operation (e.g. out of coverage) or by serving network in network-controlled operation) to form a set of pre-defined radio channel resources which may be used for D2D communication within the cluster. Furthermore, CH has a pre-allocated broadcast control channel which may be the same or different from the beaconing channel, wherein the beaconing channel is a preconfigured radio channel resource for announcing e.g. the device presence etc. The broadcast control channel may be used to send control information to cluster members. In the latter case, information about the broadcast control channel of CH may be indicated in the beaconing channel or also preconfigured like that of the beaconing channel so that members may find and listen to that channel. The broadcast control channel of CH may also have a primary-secondary structure for enhancing flexibility and capacity of the broadcast control signalling. For broadcast service, any device which is able to listen to the service may be considered as a member of the cluster.

Communication devices which only listen are referred to as passive members. They may or may not be known to the CH. E.g., the passive members may access a cluster only to listen to some broadcast messages. Those communication devices who have accessed the cluster and transmit are referred to as active members. To each active member at least one of the available channels for transmission may be assigned by the CH. The channel here is referred to e.g. some pre-configured time-frequency-code-space resources and scheduling information thereof in order to receive that channel is a semi-persistent allocation fashion, as sensible for the assumed broadcast nature of all possible L1 channels.

Furthermore, in this application it is assumed that CH may keep updating the cluster-wise available L1 channel resources including all occupied channels and free channels. CH may then indicate up-to-date information about all the occupied channels and at least a set of the free channels in the broadcast control channel. The set may comprise all free channels or a subset thereof. CH is supposed to monitor all the indicated set of the free channels. For an authenticated and authorized device which wants to get hold of a free channel from the free channel set indicated by CH, it may attempt to transmit on that selected free channel, sending a pre-defined request message including its authenticated identity and reason for requesting that channel to CH (as members are not supposed to listen to free channels but occupied channels of interest) in some contention based fashion. The attempting device then listens to the updated channel occupancy information sent by CH in the broadcast control channel to find out whether it may hold on to the selected free channel for future transmissions or not. In the positive case, the attempting device will see that the free channel it selected and tried to use is now listed as an occupied channel. In the negative case, that free channel remains in the updated set of the free channels, as indicated by CH.

It is further assumed that a member of a cluster may advertise about the cluster it belongs to (e.g. using some identity of the cluster, identity of CH, or exclusive space-reusable beacon channel ID or L1 ID of CH, or so). Thus, 2 members of 2 different clusters may discover each other including some cluster context thereof.

In some cases, the indication of individual occupied channels in the broadcast control of CH may include information of the targeted receiver(s) such as some valid identity of intended receiving UE (for unicast), UE group (for groupcast) or otherwise none (for broadcast).

In the present application, it is assumed that a cluster may be characterized by its broadcast control channel. A communication device acts as a cluster head if it allocates and schedules a resource for D2D communication via the broadcast control channel. I.e., if a cluster head is changed and the new CH uses the same broadcast control channel as the previous CH, the cluster remains the same. Also, if a member of the cluster leaves the cluster, or if a new member joins the cluster, the cluster remains the same. On the other side, if another broadcast control channel is used, the cluster is another cluster, regardless of whether or not CH and/or members are the same.

According to some embodiments of the invention, cluster members are enabled to cope with possible on-the-fly changes/failures of the current CH with/without an indication or notification about the upcoming CH changes/failures beforehand. A cluster head (CH) may change, for example, because a current CH disappears from the cluster. In radio communications, sudden or unpredictable changes in a channel may take place. On the other hand, mobile communications provides users a freedom to move. Thus, disappearing may mean that the communications device which has acted as a CH does not continue or is not going to continue acting in such a role any more. For example, the current CH may have to switch off due to running out of a battery, it may leave the cluster due to the mobility need of a user (user device is moving or has moved out of the range), it may suffer from a bad channel condition (due to moving obstacles, such as cars, or the user has taken a few steps and fallen into a radio shadow, etc.), it may experience a forced switch-off or an outage state, and so forth.

In some embodiments, CH may indicate on the coming changes (i.e. its disappearance) by 1-2 bits in the broadcast message as running status of CH in those cases for which prediction may be used e.g. the first two cases mentioned above. In the first case, the communication device acting as CH may monitor its battery level, and if the battery level is lower than a threshold, CH may indicate its disappearance and then, it may cease to act as a CH. Correspondingly, as a second example, if the communication device is switched off by the user, it may first indicate its disappearance in the shut-down routine before ceasing to act as a CH. In the second case, e.g. if the CH is in a mixed mode, it may learn from the network about its mobility, e.g. in terms of changes of timing advance over time or number of handovers per time etc. If the mobility exceeds a certain threshold, CH may indicate its disappearance and then, it may cease to act as a CH. In another example of the second case, members may detect disappearance of the former CH based on, e.g., not being able to receive an operative status information signal such as the broadcast control channel of the former CH for some preconfigured time interval or preconfigured number of successive pre-scheduled transmission occasions thereof. Then, the member may report the missing operative status information signal to the (former) CH. If a ratio of number of cluster members and number of members reporting the missing operative status information signal and/or a difference between these numbers becomes lower than a respective threshold, the CH assumes that it has disappeared, may indicate its disappearance, and may cease to act as the cluster head.

In some embodiments, members may detect disappearance of a CH even if no disappearance indication is provided by the (former) CH. For example, the CH may send a signal informing its operative status (e.g. alive/in operation). An operative status information signal may be thought as a kind of a "heartbeat" signal telling to the members that the CH is alive/in operation. Using that kind of signal may depend on the interval of the broadcast signal, which the CH is sending for conveying control information to members. Another option is that the operative status information signal may be a broadcast signal of the CH, if the interval of broadcast signal is less than a predefined period of time (e.g. a certain number of heartbeat periods such as the period itself, double period, three times the period etc.). The operative status information signal may comprise free-occupied channel information. If the operative status information signal is not received in the predefined period of time, a member may assume that the CH has disappeared.

In some embodiments, the broadcast control channel of the CH may additionally have the function of an operative status signal. That is, if a member does not receive the broadcast control channel for a certain time, it considers that the CH has disappeared.

In some embodiments of the invention, the method may be based on member-initiated CH change upon detecting disappearance of the former CH, potentially with channel carrying, as follows:

If an active member that has certain channel(s) allocated to it detects the current CH 'disappeared' for some reason then it may try to find another CH to join. If another CH is detected it may send a joining request to the other CH using a free channel of the latter.

In addition, in some embodiments, the member may try to carry on using the channel allocated to it even after joining the new cluster. Thus, in case it found and tried joining the new cluster, it may read the free-occupied channel information of the new CH and decide whether the intended channel carrying is possible or not upon joining the new CH. That is, if the channel(s) allocated to it are indicated as the occupied channel(s) of the new cluster the member may not carry the channel(s), while, if they are not indicated as occupied channel(s) they may be carried over.

In these embodiments, once a new CH is selected, active member may attempt to send a joining request indicating the wish of channel carrying to the new CH. The wish comprises the channel(s) to be carried on. It may also comprise the respective contexts. Then, the member may listen to feedback from the new CH in form of the updated free-occupied channel information. If the selected CH is able to keep the channel(s) for the active member, it will indicate it in its free-occupied channel information and the member will join the new CH still using its allocated channel(s)

If the selected CH is not able to keep the same channel for the active member, CH may allocate to the active member a free channel, e.g. the free channel on which the active member sent the joining request. The active member may determine (e.g. based on the service requirement) if the allocated free channelis usable. If it may be used, the member may join the new CH using the allocated channel to continue its D2D communication.

Otherwise, if the channel allocated by the new CH is not usable, the active member may reconfigure itself to operate as a CH, carrying on using the current channel(s). For the latter, the active member may use the current channel or beacon channel thereof for notifying the current intended receiver(s) about its CH change (new CH or new CH operation mode). This embodiment may be applied even for the cases where a running status of CH is not known (e.g. where a disappearance message is not foreseen).

In some embodiments, if the channel allocated by the new CH is not usable, the active member may request another communication device to act as a new cluster head. If the other communication device accepts to act as a new CH, the active member may join the cluster of the new CH.

In some embodiments, if there are several CHs which the member may join, it may consider the option of carrying on the current occupied channel to the new cluster as a criterion to select the most suitable CH among the detected and available CHs.

In some embodiments, if a member detects that its CH has disappeared, the member may also reconfigure itself to act as a new CH. In some of these embodiments, a decision to act as a new CH may be met before any attempt is made to find a new CH, while in other embodiments, such a decision may be met after the request to carry on the channel is negatively decided, without considering whether or not another channel offered by the other CH is acceptable.

In some embodiments, a decision whether or not to try to access a new CH first or to act as a new CH by itself may be met depending on some criteria like member priority, transmission traffic, and resource allocation status of active members. For example, if a particular active member is the main source currently transmitting for a large user group or multiple user groups on one or multiple channels then it might be beneficial to allow that active member to reconfigure itself to act as a new CH carrying all the current channels right away upon detecting the disappearance of the former CH.

Preferably, in case of a CH change, listeners of a particular active member may try to follow the active member to the new cluster as much as possible. In the context of channel carrying, as described hereinabove, this means that the listeners should try to find and join the new cluster where the current channel or some new channel relevant to them (dedicated to their user group or individuals according to Group ID or UE ID the channel is for) are present while keeping to receive the current channel. The active member may advertise about the new CH it joins/becomes on the current channel so that intended listeners may know about the targeted new CH to follow.

In some embodiments of the invention, a member may be selected as a candidate to replace the CH in case the latter disappears. The candidate may be a secondary CH in a primary-secondary CH structure. In such a primary-secondary structure, primary CH and secondary CH may share some tasks. For example, the secondary CH may take part in monitoring some exclusive set of channels allocated for cluster members to send, e.g., control signalling to CH for CH at least when CH is highly loaded with other traffic or for reliability enhancing purposes. The secondary CH may then report about the monitoring result to CH or react on the monitoring result on behalf of CH. In another example, the secondary CH may transmit broadcast control information for certain part of the cluster member, as instructed by the CH. Hence, the secondary CH may be recognized at least by a part of the cluster members. The secondary CH may or may not replicate the primary CH (due to potential task sharing).

In some embodiments, the candidate may be a stand-by CH which does not share tasks with the actual CH. It may be in a hot or cold stand-by mode. In particular, if the candidate is in the hot stand-by mode, preferably members should be aware of its presence. If the candidate is in the cold stand-by mode, in some embodiments only the actual CH may be aware of the presence of the stand-by node.

In some embodiments, the secondary or stand-by CH may be the first who detects CH changes/failures. For this, preconfigured detection criteria of CH failures/changes for secondary or stand-by CH may allow a faster and/or more reliable detection than for the other members. For example, the secondary or stand-by CH may apply the same detection mechanisms as ordinary members but one or more parameters such as a threshold parameter may be set differently. When primary CH disappears the secondary or standby CH may take charge. That is, the secondary or standby CH may take over the tasks of allocating and scheduling the D2D resource, preferably using the broadcast control channel used by the primary CH. Preferably, the secondary or standby CH performs the allocating and scheduling based on the allocation and scheduling decided by the primary CH such that, for the other members, the transition from the primary CH to the secondary CH is seamless.

If CH knows and indicates about a CH change beforehand, in embodiments with a secondary or stand-by CH, the actual CH may indicate its disappearance to the secondary or stand-by CH only, but it may also notify other members, e.g. all the members.

In some embodiments of the invention, the method may be based on a semi-transparent or seamless CH replacement in which the current CH selects and requests one active member to become a new CH. The new CH may operate all the current control channels as such (from resource allocation and scheduling points of view at least) so that CH change is virtually invisible to most of the cluster members. Insofar, the primary-secondary structure described above may be considered as a seamless CH replacement, wherein the request to an active member is temporally separated from the actual replacement. Preferably, the communication device acting as the current CH ceases acting as CH after it requested another active member to become the new CH.

In the cases of primary-secondary structure and seamless CH replacement, some of the cluster members may not be able to detect the new CH. These members may use the member-initiated CH change mechanism proposed above on an individual basis.

There are some other alternatives/options to the above based on e.g. inter-cluster HO in which the current CH hands over members to preselected CH(s). However, these options are complex and resource-consuming.

After a CH change, active member who has channel allocation and broadcasting transmission and passive member who listens to the allocated channel of the active member may or may not join the same cluster.

If the active and passive members join the same cluster, continuing the D2D communication is straightforward, assisted by the new CH.

However, even if the active and passive members do not join the same cluster, according to some embodiments of the invention, continuing the D2D communication is possible. In this case, it is considered that 2 members of 2 different clusters may discover each other including the cluster context thereof and that direct communication between these 2 members is possible.

For example, the active and passive members may belong to different clusters which have inter-cluster relationship established. By an inter-cluster relationship, two clusters may coordinate their e.g. allocations and scheduling with each other, e.g. via a member of the first clusters which is able to detect the cluster head of the second cluster, or via a chain of a member of the first cluster and a member of the second cluster, wherein these members are able to communicate with each other in a D2D communication. The active member and the passive member in the different clusters may use this path for inter-cluster relationship to communicate with each other in a D2D communication (i.e. to continue their communication).

According to another embodiment of the invention, the active member which wants to initiate or continue the D2D communication with the passive member, which is a member of another cluster, may first join the other cluster. Then, the method may proceed as if the two members had always been in the same cluster. For this, the initiating (active) member should be able to discover the CH of the other cluster and join the other cluster, potentially with assistance from its current CH.

In some embodiments, a D2D capable device may be a member of more than one local cluster. In other embodiments, the initiating member may have to leave the current cluster and join the other one to conduct the D2D communication of interest with the passive member.

In particular for autonomous D2D communications, the above embodiments may be realized based on hard-coded pre-configurations and self-organizing capability of D2D devices. For network-controlled D2D communications, in some embodiments many elements may be realized using assistance services from the network (serving eNB). In these embodiments, the serving eNB may be considered as a coordination point or master of all CHs operating inside its cell. In this regard, the serving eNB may be able to take over or provide assistance in any functions of CH towards members using cellular access (common or dedicated control). Thus, the problem of CH changes may be resolved by assistance of the serving eNB.

The options described hereinabove how a member may act in case of a CH change wherein its communication partner is in a different cluster are complementary. They may be combined to provide more robust cluster based D2D communications. For example, the member may first detect if there is an inter-cluster relationship established and use the same in the affirmative. Only if the inter-cluster relationship is not established, it may attempt to join the other cluster. As another example, the member may first attempt to join the other cluster. If this attempt fails, it may detect if there is an inter-cluster relationship established and then, in the affirmative, use the same.

In FIG. 1, a diagram illustrating a configuration of a communication element (communication device) acting as a member in a change of CH according to an embodiment is shown. It is to be noted that the communication element like the UE1 10 shown in FIG. 1 may comprise further elements or functions besides those described herein below. Furthermore, even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 1 may comprise a processing function, control unit or processor 11, such as a CPU or the like, which is suitable for executing instructions given by programs or the like related to the CH change procedure. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denotes input/output (I/O) units (interfaces, such as transceivers) connected to the processor 11. The I/O units 12 may be used for communicating with one or more communication devices like UEs e.g. in a D2D communication. Reference sign 13 denotes a memory usable, for example, for storing data and programs to be executed by the processor 11 and/or as a working storage of the processor 11.

The processor 11 is configured to execute processing related to at least one of the above described cluster head change procedures.

Figure 2:
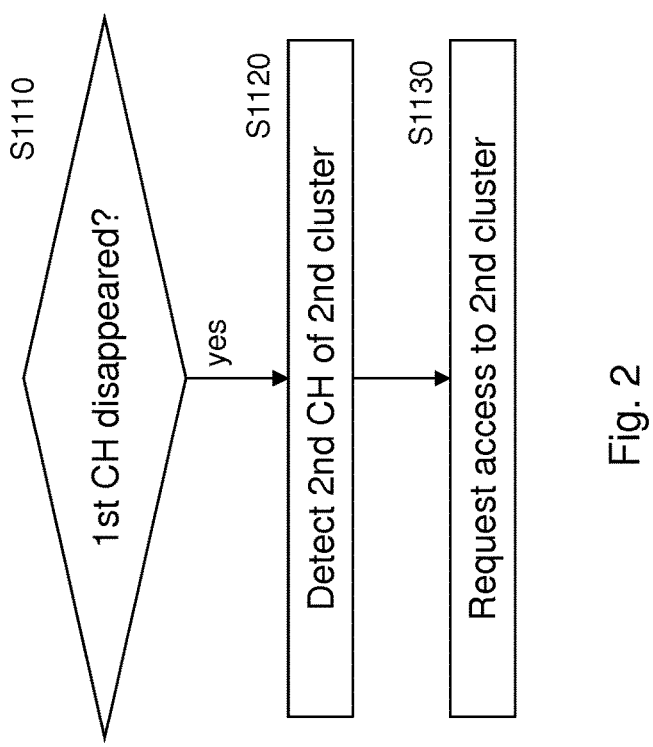
FIG. 2 shows a method according to an embodiment of the invention.

FIG. 2 shows a method according to an embodiment of the invention. The processor 11 together with the memory 13 of FIG. 1 may perform the method of FIG. 2 but is not limited to this method. The method of FIG. 2 may be performed by the processor 11 and memory 13 of FIG. 1 but is not limited to being performed by this apparatus.

The processor 11 comprises, as sub-portions, monitoring means 1110, detecting means 1120, and requesting means 1130.

The monitoring means 1110 monitors if a first cluster head of a first cluster of first communication devices has disappeared, wherein UE1 or the processor 11 with memory 13 has access to the first cluster enabling a device-to-device communication of UE1 or the processor 11 with memory 13 with at least one of the first communication devices (S1110).

If it is monitored that the first cluster head has disappeared ("yes" in step S1110), the detecting means detects a second cluster head of a second cluster, wherein the second cluster head is different from the first cluster head, and the second cluster enables the device-to-device communication between at least two of the second communication devices (S1120); and the requesting means 1130 requests access to the second cluster for the device-to-device communication (S1130).

Figure 3:
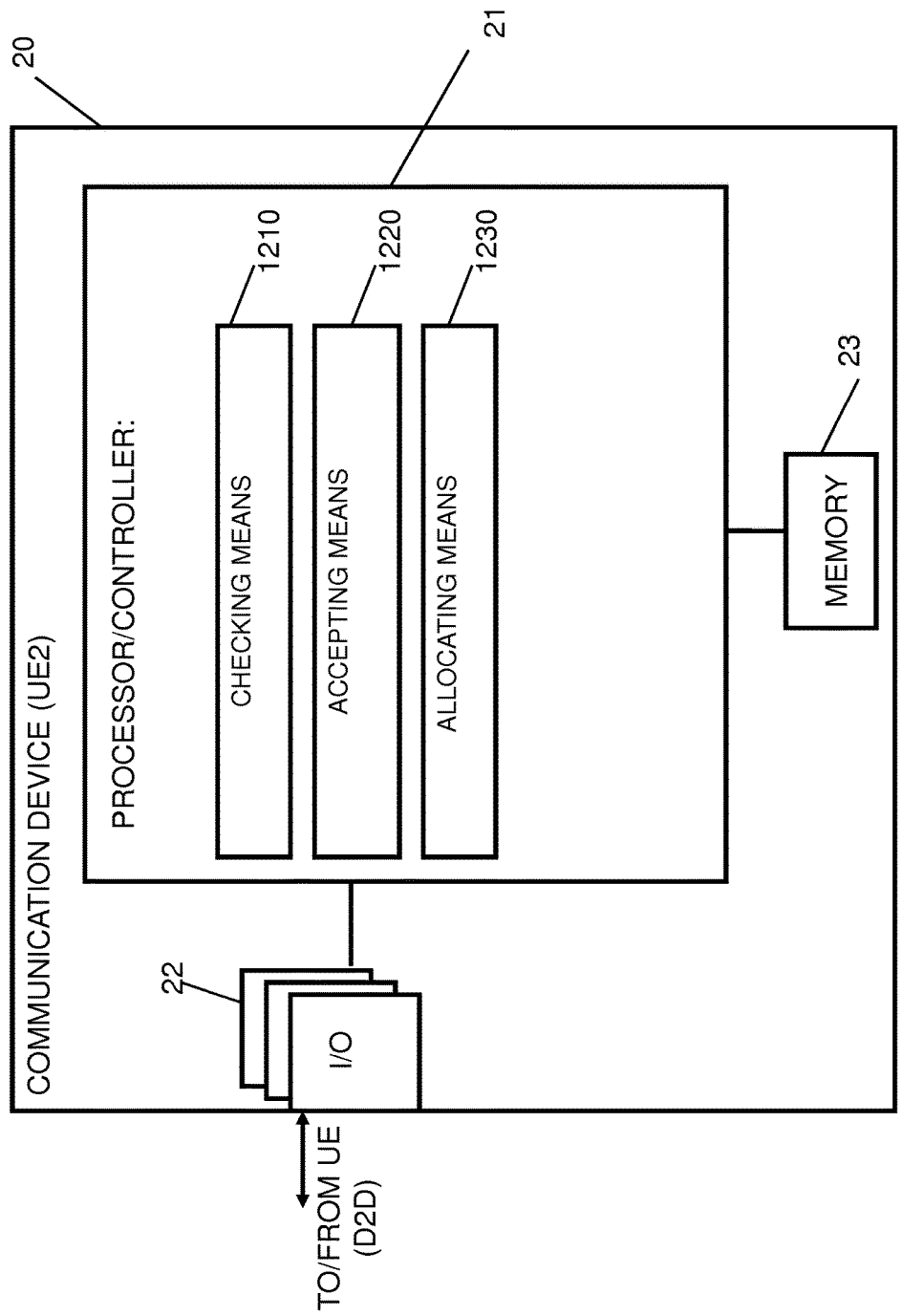
FIG. 3 shows an apparatus according to an embodiment of the invention.

In FIG. 3, a diagram illustrating a configuration of a communication element (communication device) acting as a cluster head in a change of CH according to an embodiment is shown. It is to be noted that the communication element like the UE2 20 shown in FIG. 3 may comprise further elements or functions besides those described herein below. Furthermore, even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 3 may comprise a processing function, control unit or processor 21, such as a CPU or the like, which is suitable for executing instructions given by programs or the like related to the CH change procedure. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 22 denotes input/output (I/O) units (interfaces, such as transceivers) connected to the processor 21. The I/O units 22 may be used for communicating with one or more communication devices like UEs e.g. in a D2D communication. Reference sign 23 denotes a memory usable, for example, for storing data and programs to be executed by the processor 21 and/or as a working storage of the processor 21.

The processor 21 is configured to execute processing related to at least one of the above described cluster head change procedures.

Figure 4:
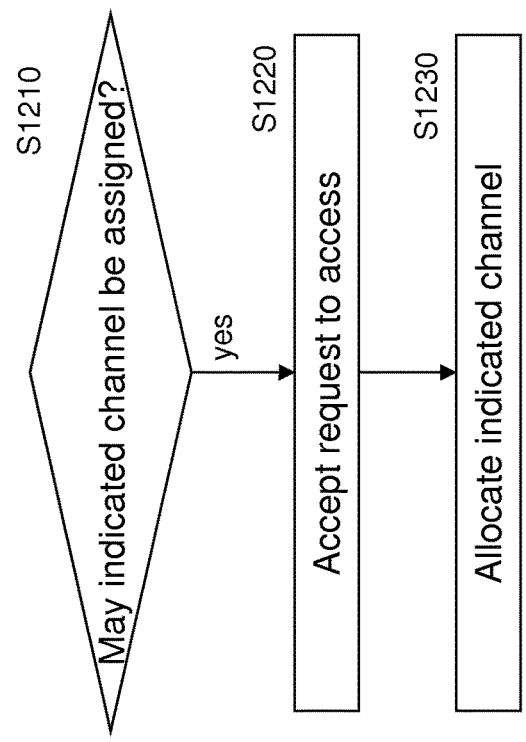
FIG. 4 shows a method according to an embodiment of the invention.

FIG. 4 shows a method according to an embodiment of the invention. The processor 21, together with the memory 23 of FIG. 3 may perform the method of FIG. 4 but is not limited to this method. The method of FIG. 4 may be performed by the processor 21 and memory 23 of FIG. 3 but is not limited to being performed by this apparatus.

The processor 21 comprises, as sub-portions, checking means 1210, accepting means 1220, and allocating means 1230.

The checking means 1210 checks if a first channel may be assigned to a device-to-device communication of a first communication device, wherein the first channel is indicated in a request to access to a cluster of second communication devices, the cluster enables a device-to-device communication of UE2 or its processor 21 together with memory 23 with at least one of the second communication devices, the second communication devices are different from the first communication device, the request is received from the first communication device, and UE2 or its processor 21 together with memory 23 acts as a cluster head of the cluster (S1210).

If the first channel may be assigned to the device-to-device communication of the communication device ("yes" in step S1210), the accepting means 1220 accepts the request of the first communication device to access the cluster (S1220); and the allocating means 1230 allocates the first channel to the device-to-device communication of the first communication device in the cluster (S1230).

Figure 5:
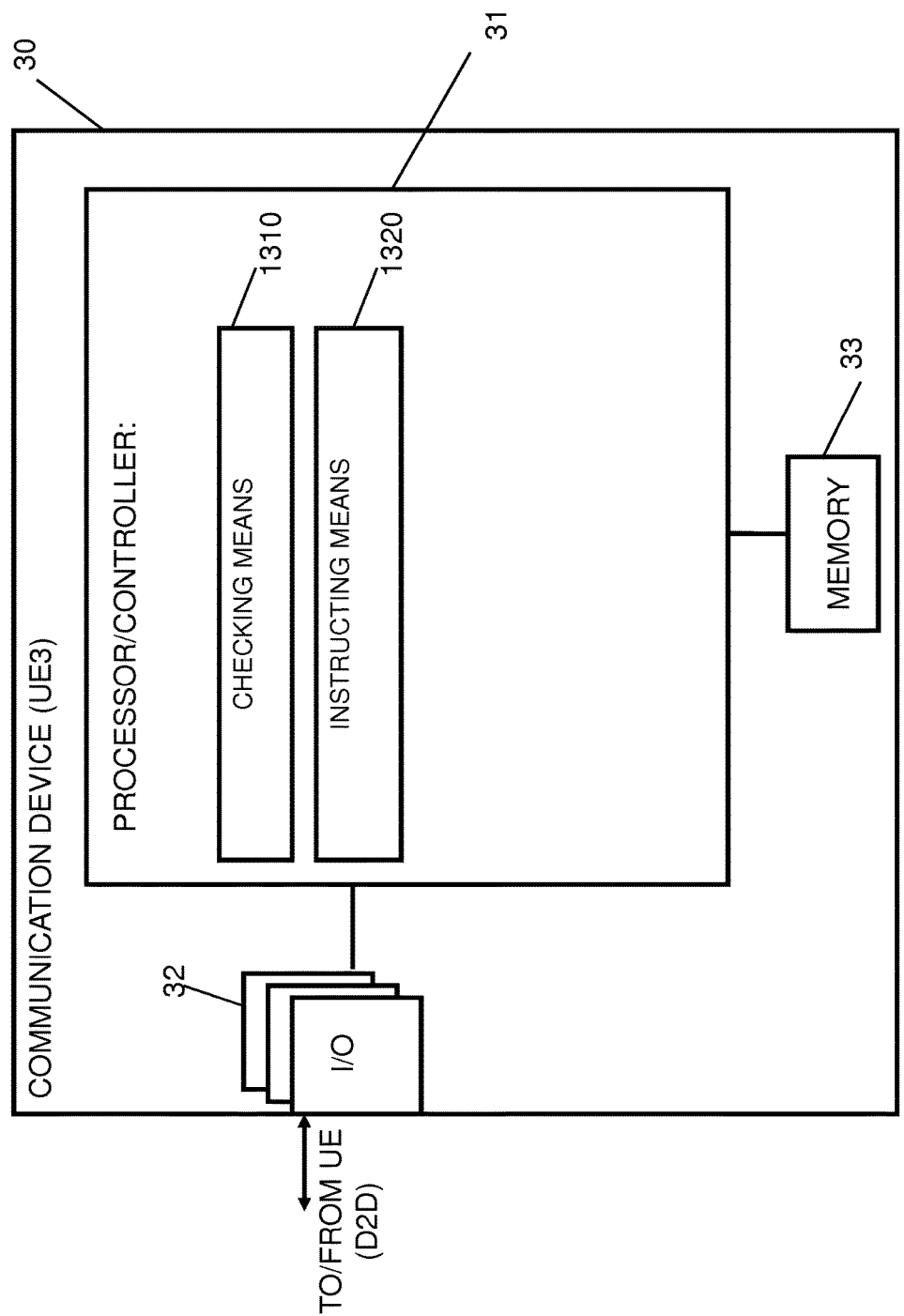
FIG. 5 shows an apparatus according to an embodiment of the invention.

In FIG. 5, a diagram illustrating a configuration of a communication element (communication device) acting as a primary cluster head in a change of CH according to an embodiment is shown. It is to be noted that the communication element like the UE3 30 shown in FIG. 5 may comprise further elements or functions besides those described herein below. Furthermore, even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 5 may comprise a processing function, control unit or processor 31, such as a CPU or the like, which is suitable for executing instructions given by programs or the like related to the CH change procedure. The processor 31 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 32 denotes input/output (I/O) units (interfaces, such as transceivers) connected to the processor 31. The I/O units 32 may be used for communicating with one or more communication devices like UEs e.g. in a D2D communication. Reference sign 33 denotes a memory usable, for example, for storing data and programs to be executed by the processor 31 and/or as a working storage of the processor 31.

The processor 31 is configured to execute processing related to at least one of the above described cluster head change procedure.

Figure 6:
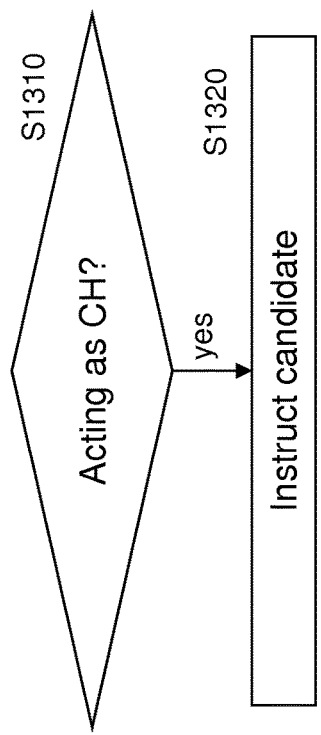
FIG. 6 shows a method according to an embodiment of the invention.

FIG. 6 shows a method according to an embodiment of the invention. The processor 31, together with the memory 33 of FIG. 5 may perform the method of FIG. 6 but is not limited to this method. The method of FIG. 6 may be performed by the processor 31 and memory 33 of FIG. 5 but is not limited to being performed by this apparatus.

The processor 31 comprises, as sub-portions, checking means 1310 and instructing means 1320.

The checking means 1310 checks if UE3 or its processor 31 together with memory 33 acts as a cluster head of a cluster of communication devices, wherein the cluster enables a device-to-device communication between UE3 or its processor 31 together with memory 33 and at least one of the communication devices (S1310).

If UE31 or its processor 31 together with memory 33 acts as the cluster head, the instructing means 1320 instructs a first communication device of the communication devices to be a candidate for acting as the cluster head of the cluster for a case that the apparatus ceases to act as the cluster head of the cluster, wherein the first communication device is different from the UE31 or its processor 31 together with memory 33.

Figure 7:
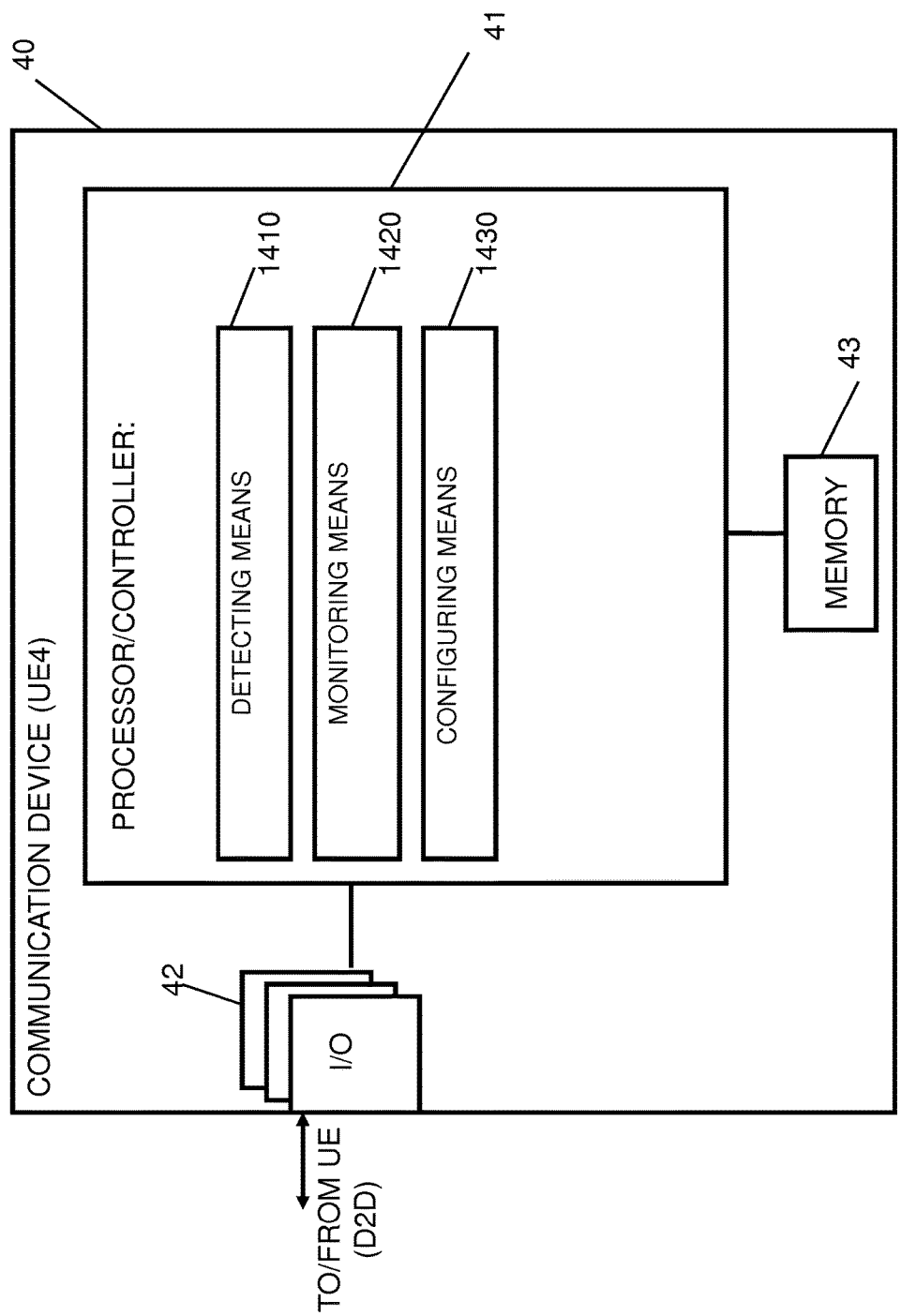
FIG. 7 shows an apparatus according to an embodiment of the invention.

In FIG. 7, a diagram illustrating a configuration of a communication element (communication device) acting as a secondary cluster head in a change of CH according to an embodiment is shown. It is to be noted that the communication element like the UE4 40 shown in FIG. 7 may comprise further elements or functions besides those described herein below. Furthermore, even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 7 may comprise a processing function, control unit or processor 41, such as a CPU or the like, which is suitable for executing instructions given by programs or the like related to the CH change procedure. The processor 41 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 42 denotes input/output (I/O) units (interfaces, such as transceivers) connected to the processor 41. The I/O units 42 may be used for communicating with one or more communication devices like UEs e.g. in a D2D communication. Reference sign 43 denotes a memory usable, for example, for storing data and programs to be executed by the processor 41 and/or as a working storage of the processor 41.

The processor 41 is configured to execute processing related to at least one of the above described cluster head change procedures.

Figure 8:
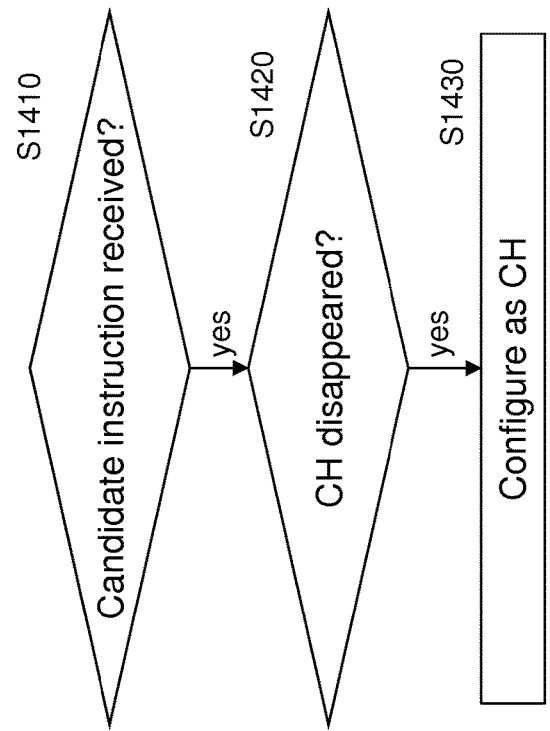
FIG. 8 shows a method according to an embodiment of the invention.

FIG. 8 shows a method according to an embodiment of the invention. The processor 41, together with the memory 43 of FIG. 7 may perform the method of FIG. 8 but is not limited to this method. The method of FIG. 8 may be performed by the processor 41 and memory 43 of FIG. 7 but is not limited to being performed by this apparatus.

The processor 41 comprises, as sub-portions, detecting means 1410, monitoring means 1420, and configuring means 1430.

The detecting means 1410 detects if an instruction is received to be a candidate for acting as a cluster head of a cluster of communication devices for a case that a communication device acting as the cluster head of the cluster disappears, wherein UE4 or its processor 41 together with memory 43 has an access to the cluster of the cluster head, and the cluster enables a device-to-device communication between UE4 or its processor 41 together with memory 43 and at least one of the communication devices.

If the instruction to act as a secondary cluster head is detected ("yes" in step S1410), the monitoring means 1420 monitors if the cluster head has disappeared (S1420).

If it is monitored that the cluster head has disappeared ("yes" in step S1420), the configuring means 1430 configures the UE4 or its processor 41 together with memory 43 to act as a new cluster head of the cluster (S1430).

Figure 9:
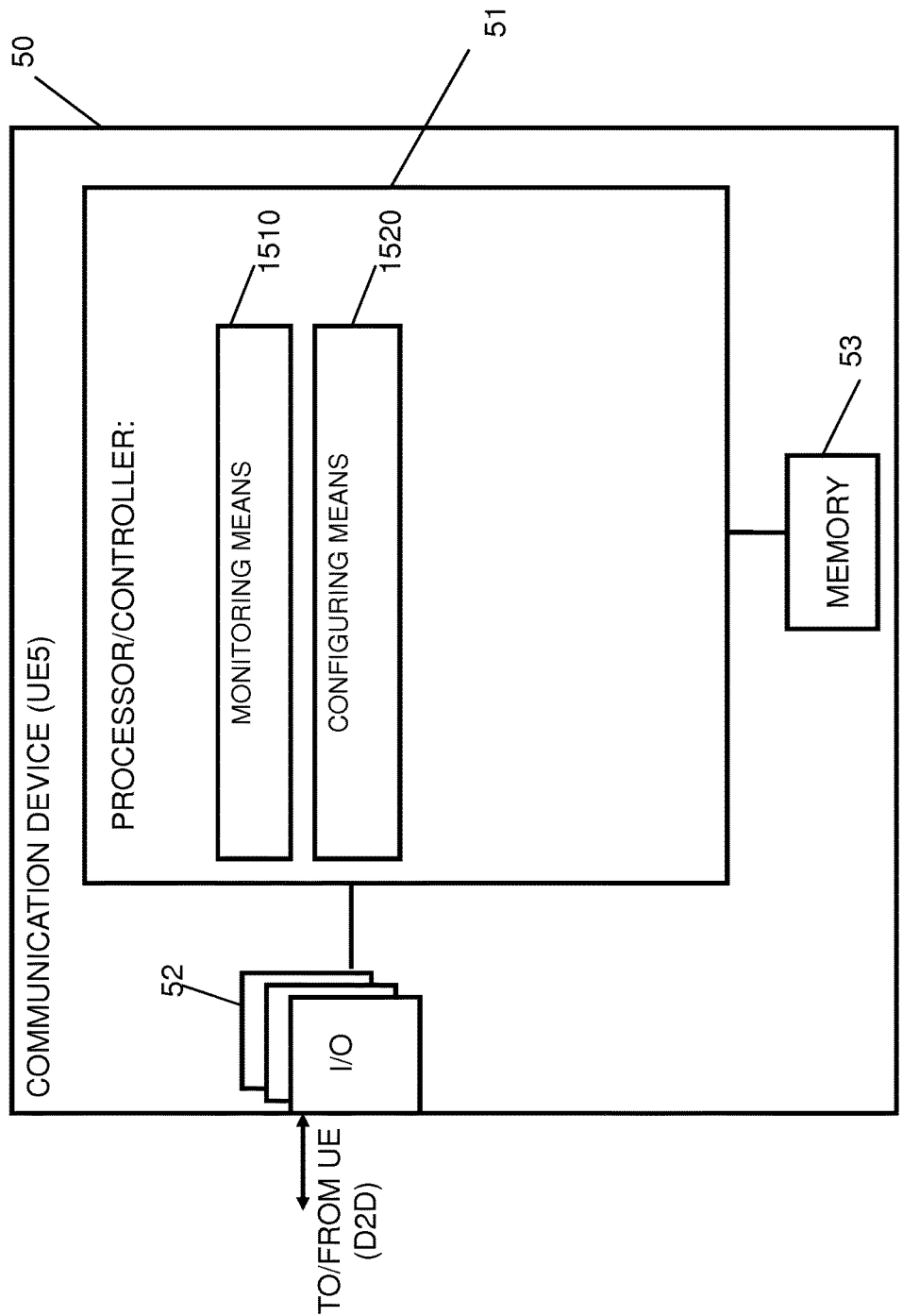
FIG. 9 shows an apparatus according to an embodiment of the invention.

In FIG. 9, a diagram illustrating a configuration of a communication element (communication device) acting as a member in a change of CH according to an embodiment is shown. It is to be noted that the communication element like the UE5 50 shown in FIG. 9 may comprise further elements or functions besides those described herein below. Furthermore, even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 9 may comprise a processing function, control unit or processor 51, such as a CPU or the like, which is suitable for executing instructions given by programs or the like related to the CH change procedure. The processor 51 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 52 denotes input/output (I/O) units (interfaces, such as transceivers) connected to the processor 51. The I/O units 52 may be used for communicating with one or more communication devices like UEs e.g. in a D2D communication. Reference sign 53 denotes a memory usable, for example, for storing data and programs to be executed by the processor 51 and/or as a working storage of the processor 51.

The processor 51 is configured to execute processing related to at least one of the above described cluster head change procedures.

Figure 10:
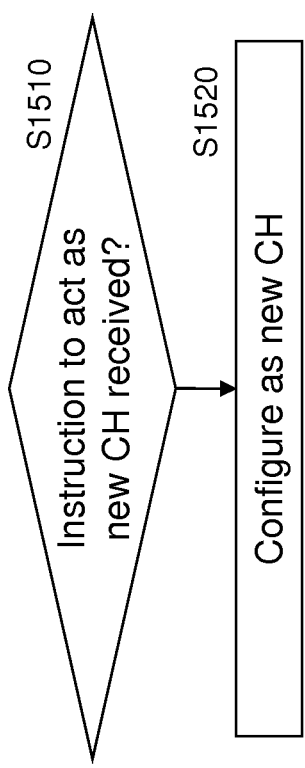
FIG. 10 shows a method according to an embodiment of the invention.

FIG. 10 shows a method according to an embodiment of the invention. The processor 51, together with the memory 53 of FIG. 9 may perform the method of FIG. 10 but is not limited to this method. The method of FIG. 10 may be performed by the processor 51 and memory 53 of FIG. 9 but is not limited to being performed by this apparatus.

The processor 51 comprises, as sub-portions, monitoring means 1510 and configuring means 1520.

The monitoring means 1510 monitors if an instruction to act as a new cluster head is received from a first cluster head of a cluster of communication devices, wherein UE5 or its processor 51 together with memory 53 has an access to the cluster, and the cluster enables a device-to-device communication between UE5 or its processor 51 together with memory 53 and at least one of the communication devices If the instruction is received ("yes" in step S1510), the configuring means configures UE5 or its processor 51 together with memory 53 to act as the new cluster head of the cluster (S1520).

Figure 11:
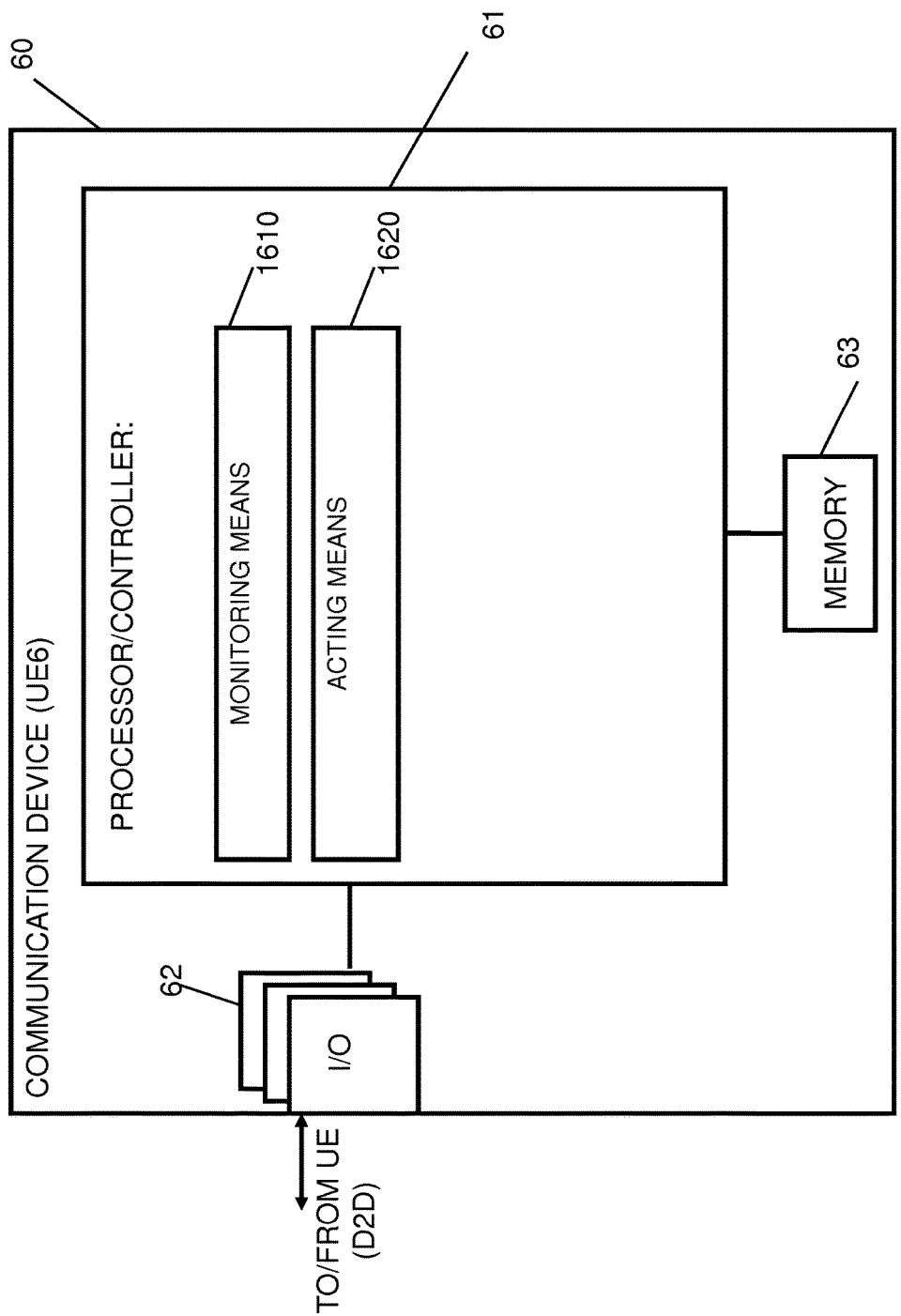
FIG. 11 shows an apparatus according to an embodiment of the invention.

In FIG. 11, a diagram illustrating a configuration of a communication element (communication device) acting as an "old" CH in a change of CH according to an embodiment is shown. It is to be noted that the communication element like the UE6 60 shown in FIG. 11 may comprise further elements or functions besides those described herein below. Furthermore, even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 11 may comprise a processing function, control unit or processor 61, such as a CPU or the like, which is suitable for executing instructions given by programs or the like related to the CH change procedure. The processor 61 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 62 denotes input/output (I/O) units (interfaces, such as transceivers) connected to the processor 61. The I/O units 62 may be used for communicating with one or more communication devices like UEs e.g. in a D2D communication. Reference sign 63 denotes a memory usable, for example, for storing data and programs to be executed by the processor 61 and/or as a working storage of the processor 61.

The processor 61 is configured to execute processing related to at least one of the above described cluster head change procedures.

Figure 12:
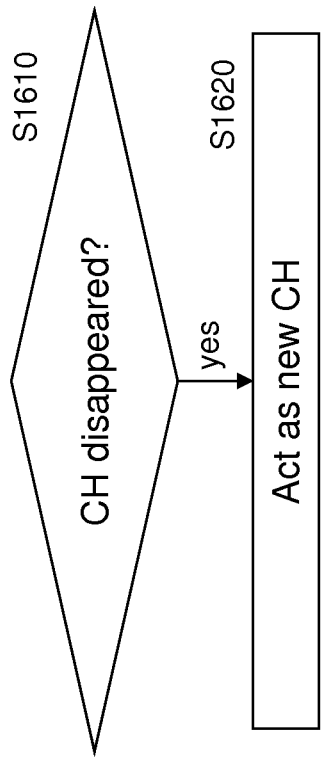
FIG. 12 shows a method according to an embodiment of the invention.

FIG. 12 shows a method according to an embodiment of the invention. The processor 61, together with the memory 63 of FIG. 11 may perform the method of FIG. 12 but is not limited to this method. The method of FIG. 12 may be performed by the processor 61 and memory 63 of FIG. 11 but is not limited to being performed by this apparatus.

The processor 61 comprises, as sub-portions, monitoring means 1610, and acting means 1620.

The monitoring means 1610 monitors if a cluster head of a cluster of communication devices has disappeared, wherein UE6 or its processor 61 together with memory 63 has access to the cluster, and the cluster enables a device-to-device communication of UE6 or its processor 61 together with memory 63 with at least one of the communication devices (S1610).

If it is monitored that the cluster head has disappeared ("yes" in step S1610), the acting means 1620 acts as the cluster head of the cluster (S1620).

Figure 13:
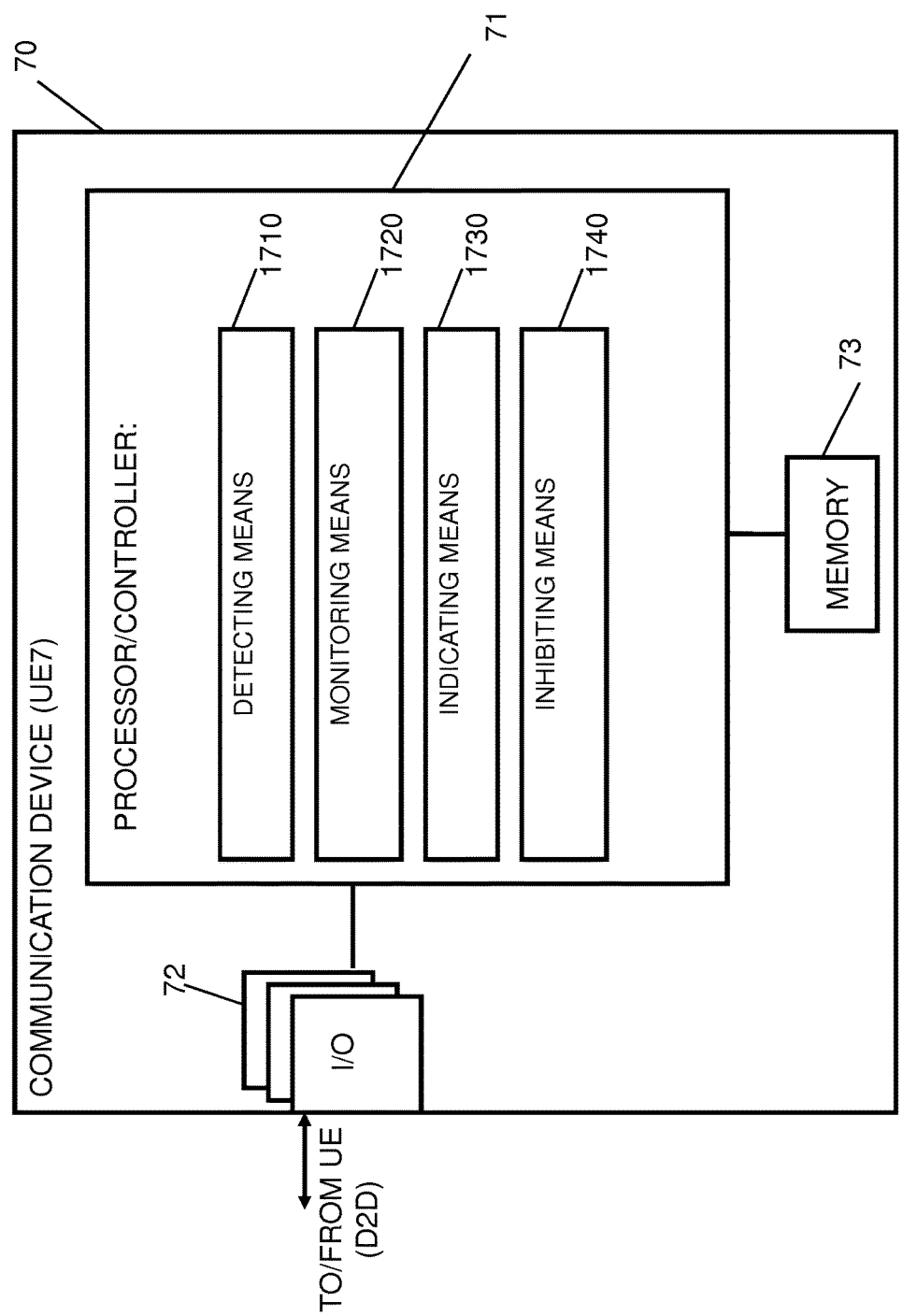
FIG. 13 shows an apparatus according to an embodiment of the invention.

In FIG. 13, a diagram illustrating a configuration of a communication element (communication device) acting as an "new" CH in a change of CH according to an embodiment is shown. It is to be noted that the communication element like the UE 70 shown in FIG. 13 may comprise further elements or functions besides those described herein below. Furthermore, even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 13 may comprise a processing function, control unit or processor 71, such as a CPU or the like, which is suitable for executing instructions given by programs or the like related to the CH change procedure. The processor 71 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 72 denotes input/output (I/O) units (interfaces, such as transceivers) connected to the processor 71. The I/O units 72 may be used for communicating with one or more communication devices like UEs e.g. in a D2D communication. Reference sign 73 denotes a memory usable, for example, for storing data and programs to be executed by the processor 71 and/or as a working storage of the processor 71.

The processor 71 is configured to execute processing related to at least one of the above described cluster head change procedures.

Figure 14:
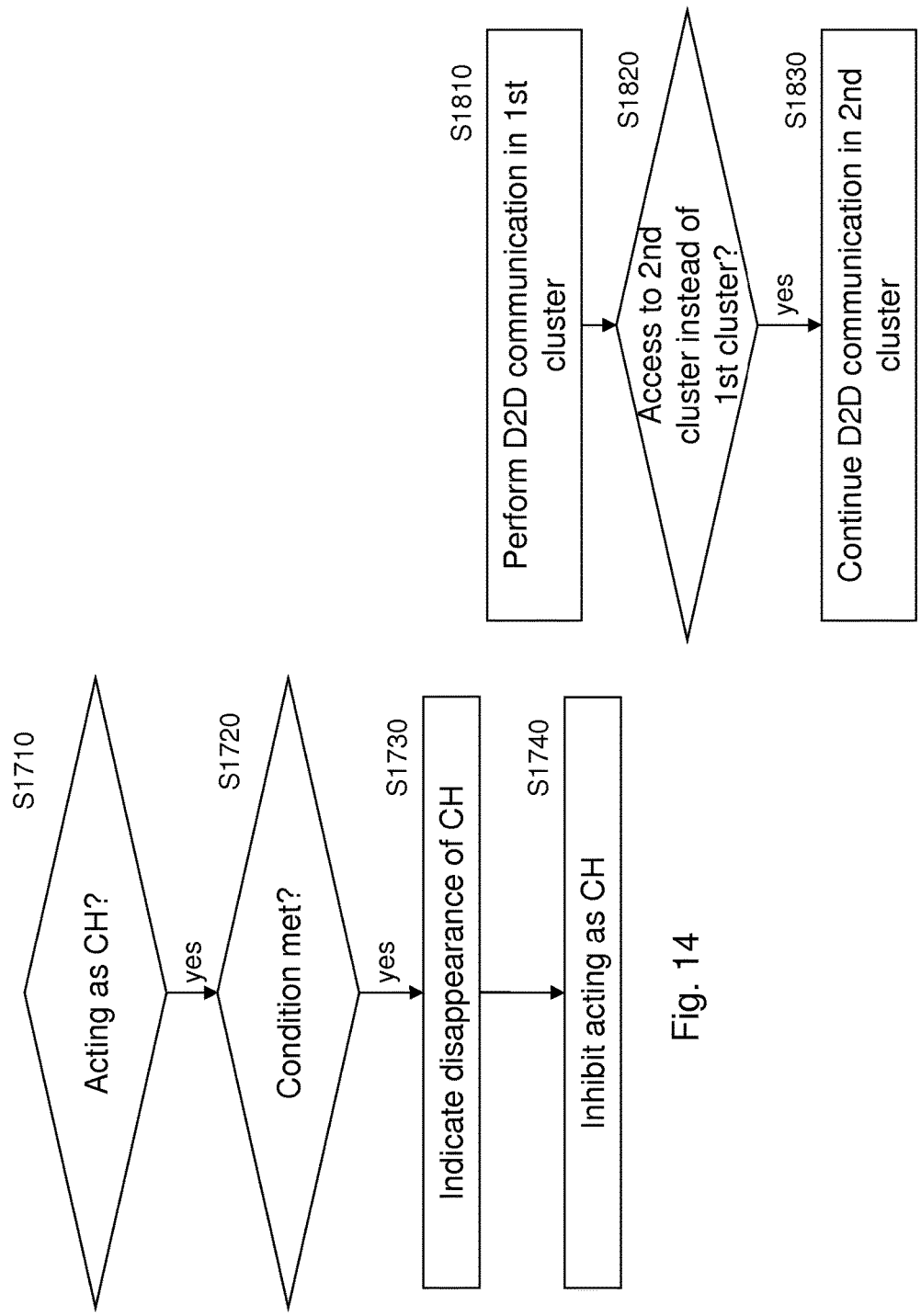
FIG. 14 shows a method according to an embodiment of the invention.

FIG. 14 shows a method according to an embodiment of the invention. The processor 71, together with the memory 73 of FIG. 13 may perform the method of FIG. 14 but is not limited to this method. The method of FIG. 14 may be performed by the processor 71 and memory 73 of FIG. 13 but is not limited to being performed by this apparatus.

The processor 71 comprises, as sub-portions, detecting means 1710, monitoring means 1720, indicating means 1730, and inhibiting means 1740.

The detecting means 1710 detects if UE7 or its processor 71 together with memory 73 acts as a cluster head for a device-communication for a cluster of communication devices, wherein the cluster enables a device-to-device communication between UE7 or its processor 71 together with memory 73 and at least one of the communication devices (S1710).

If it is detected that UE7 or its processor 71 together with memory 73 acts as the cluster head ("yes" in step S1710), the monitoring means 1720 monitors if a condition is met (S1720), wherein UE7 or its processor 71 together with memory 73 is expected to disappear from acting as the cluster head of the cluster if the condition is met.

If it is monitored that the condition is met ("yes" in step S1720), the indicating means 1730 indicates that UE7 or its processor 71 together with memory 73 will disappear from acting as the cluster head (S1730). Then, the inhibiting means 1740 inhibits UE7 or its processor 71 together with memory 73 from acting as the cluster head (S1740).

Figure 15:
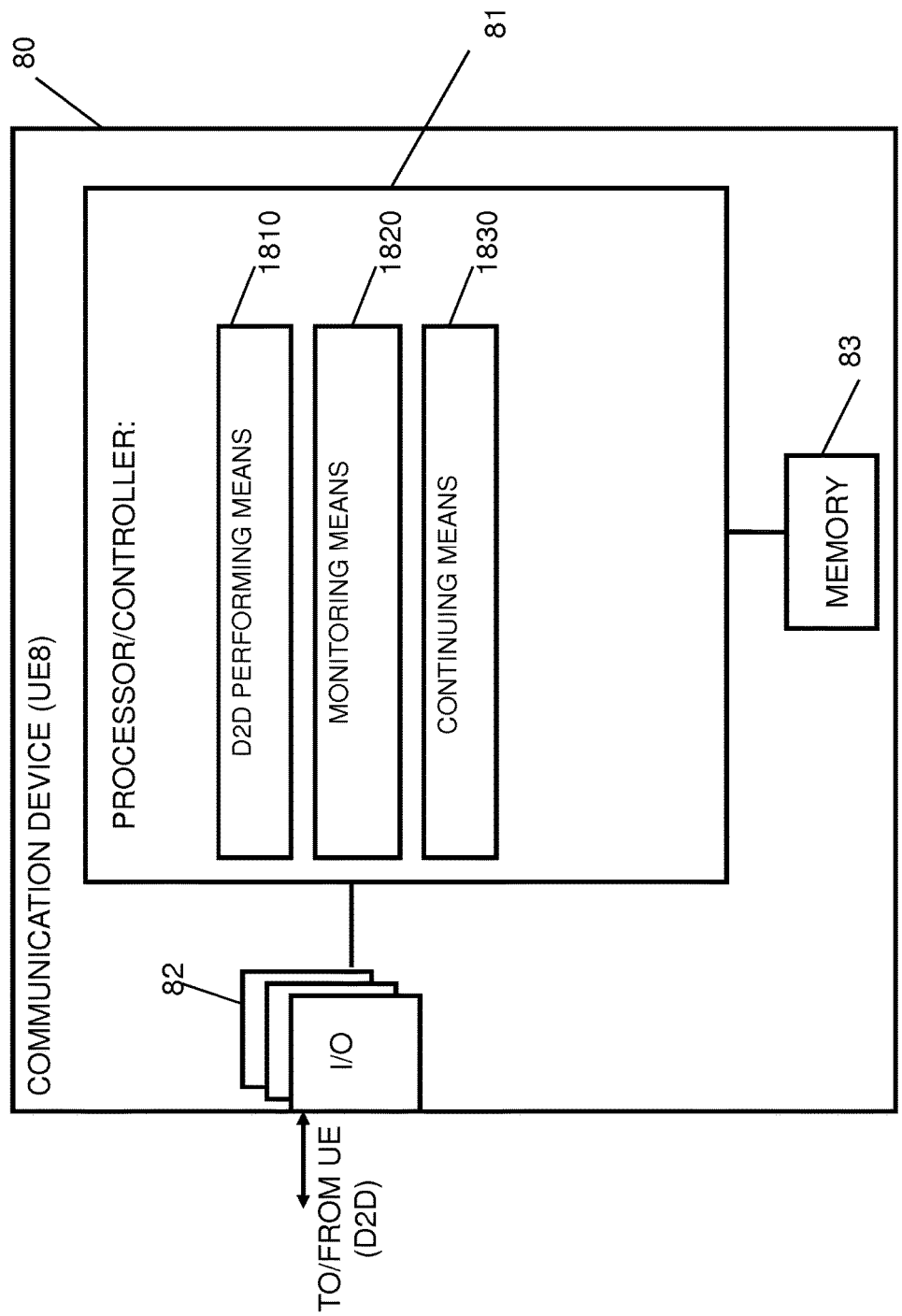
FIG. 15 shows an apparatus according to an embodiment of the invention.

In FIG. 15, a diagram illustrating a configuration of a communication element (communication device) acting as a CH in a change of CH according to an embodiment is shown. It is to be noted that the communication element like the UE 80 shown in FIG. 15 may comprise further elements or functions besides those described herein below. Furthermore, even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 15 may comprise a processing function, control unit or processor 81, such as a CPU or the like, which is suitable for executing instructions given by programs or the like related to the CH change procedure. The processor 81 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 82 denotes input/output (I/O) units (interfaces, such as transceivers) connected to the processor 81. The I/O units 82 may be used for communicating with one or more communication devices like UEs e.g. in a D2D communication. Reference sign 83 denotes a memory usable, for example, for storing data and programs to be executed by the processor 81 and/or as a working storage of the processor 81.

The processor 81 is configured to execute processing related to at least one of the above described cluster head change procedures.

FIG. 16 shows a method according to an embodiment of the invention. The processor 81, together with the memory 83 of FIG. 15 may perform the method of FIG. 16 but is not limited to this method. The method of FIG. 16 may be performed by the processor 81 and memory 83 of FIG. 15 but is not limited to being performed by this apparatus.

The processor 81 comprises, as sub-portions, D2D performing means 1810, monitoring means 1820, and continuing means 1830.

The D2D performing means 1810 performs a device-to-device communication with a partner communication device of first communication devices in a first cluster of the first communication devices with a first cluster head, wherein the first cluster enables the device-to-device communication between UE8 or its processor 81 and memory 83 and at least the partner communication device (S1810).

The monitoring means 1820 monitors if UE8 or its processor 81 and memory 83 gets an access to a second cluster of second communication devices with a second cluster head instead of the first cluster of the first cluster head, wherein the second cluster head is different from the first cluster head, and the second cluster enables the device-to-device communication between at least two of the second communication devices (S1820).

If it monitored that UE8 or its processor 81 and memory 83 gets the access to the second cluster ("yes" in step S1820), the continuing means 1830 continues the device-to-device communication with the partner communication device in the second cluster (S1830).

Figure 17:
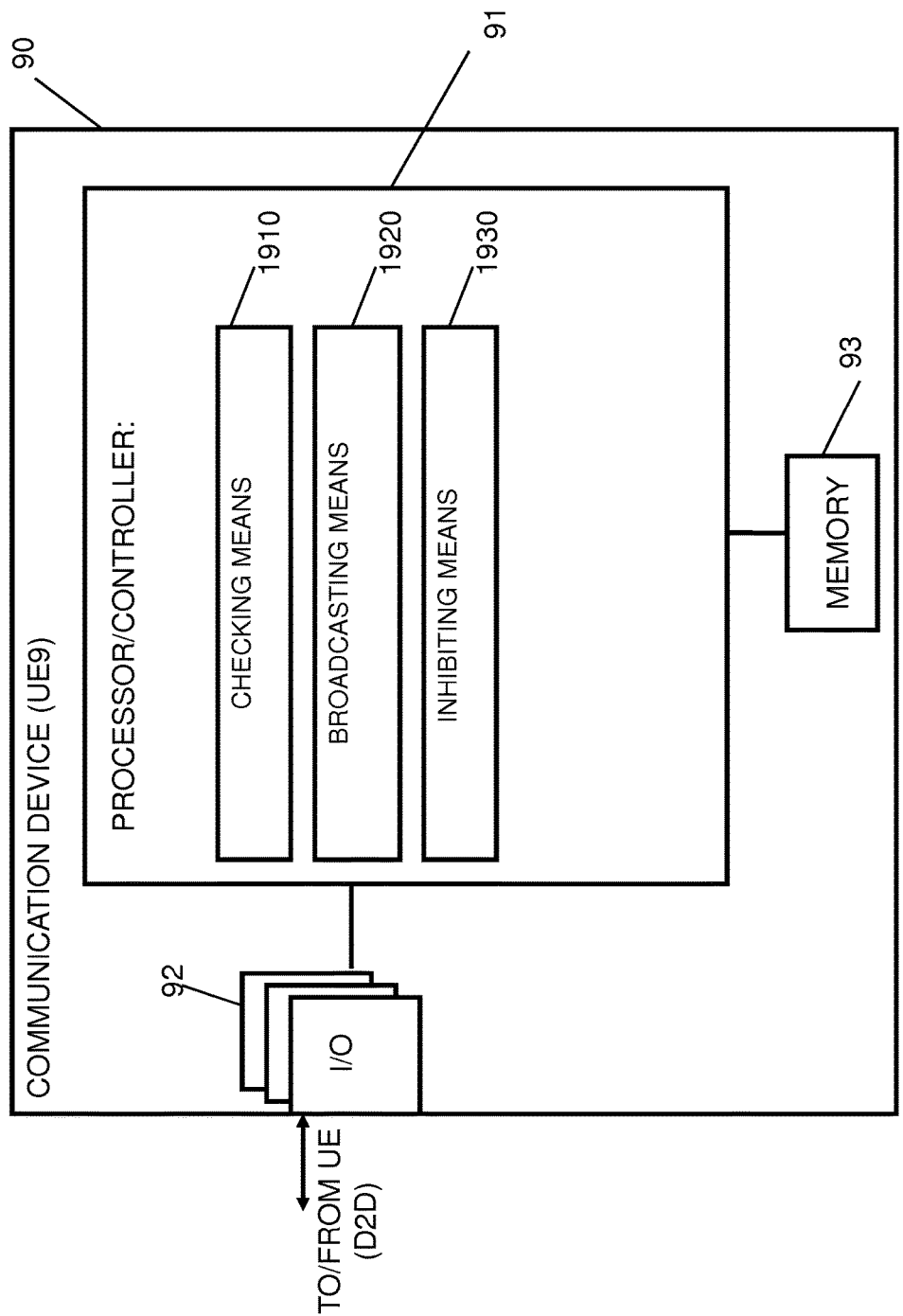
FIG. 17 shows an apparatus according to an embodiment of the invention.

In FIG. 17, a diagram illustrating a configuration of a communication element (communication device) acting as a member in a change of CH according to an embodiment is shown. It is to be noted that the communication element like the UE 90 shown in FIG. 17 may comprise further elements or functions besides those described herein below. Furthermore, even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 17 may comprise a processing function, control unit or processor 91, such as a CPU or the like, which is suitable for executing instructions given by programs or the like related to the CH change procedure. The processor 91 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 92 denotes input/output (I/O) units (interfaces, such as transceivers) connected to the processor 91. The I/O units 92 may be used for communicating with one or more communication devices like UEs e.g. in a D2D communication. Reference sign 93 denotes a memory usable, for example, for storing data and programs to be executed by the processor 91 and/or as a working storage of the processor 91.

The processor 91 is configured to execute processing related to at least one of the above described cluster head procedures.

Figure 18:
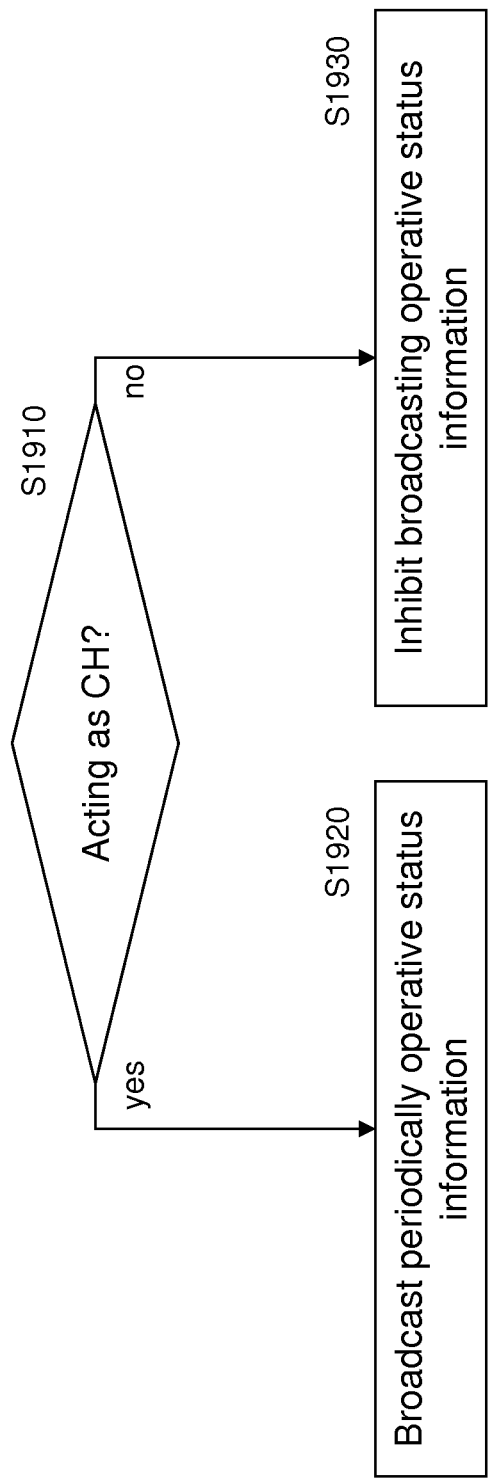
FIG. 18 shows a method according to an embodiment of the invention.

FIG. 18 shows a method according to an embodiment of the invention. The processor 91, together with the memory 93 of FIG. 17 may perform the method of FIG. 18 but is not limited to this method. The method of FIG. 18 may be performed by the processor 91 and memory 93 of FIG. 17 but is not limited to being performed by this apparatus.

The processor 91 comprises, as sub-portions, checking means 1910, broadcasting means 1920, and inhibiting means 1930.

The checking means 1910 checks if UE9 or its processor 91 together with memory 93 acts as a cluster head of a cluster of communication devices, wherein the cluster enables a device-to-device communication between UE9 or its processor 91 together with memory 93 and at least one of the communication devices (S1910).

If UE9 or its processor 91 together with memory 93 acts as the cluster head ("yes" in step S1910), the broadcasting means 1920 broadcasts periodically an operative status information signal (S1920).

If UE9 or its processor 91 together with memory 93 does not act as the cluster head ("no" in step S1910), the inhibiting means UE9 or its processor 91 (in particular: the broadcasting means 1920) together with memory 93 from broadcasting the operative status information signal (S1930).

According to an embodiment, there is provided an apparatus, comprising means for monitoring, if a first cluster head of a first cluster of first communication devices has disappeared, wherein an apparatus performing the method has an access to the first cluster enabling a device-to-device communication of the apparatus with at least one of the first communication devices, means for detecting a second cluster head of a second cluster of second communication devices, wherein the second cluster head is different from the first cluster head, and the second cluster enables the device-to-device communication between at least two of the second communication devices; and means for requesting an access to the second cluster for the device-to-device communication.

According to another embodiment, there is provided an apparatus, comprising: means for checking, if a first channel may be assigned to a device-to-device communication of a first communication device, wherein the first channel is indicated in a request to an access to a cluster of second communication devices, the cluster enabling a device-to-device communication, the second communication devices being different from the first communication device, means for accepting the request of the first communication device to access to the cluster; and means for allocating the first channel to the device-to-device communication of the first communication device in the cluster.

According to another embodiment, there is provided an apparatus, comprising: means for checking, if acting as a cluster head of a cluster of communication devices, wherein the cluster enables a device-to-device communication between the apparatus and at least one of the communication devices, and means for instructing a first communication device of the communication devices to be a candidate for acting as a cluster head of the cluster for a case the acting cluster head ceases to act as the cluster head of the cluster, wherein the first communication device is not yet acting as a cluster head.

According to another embodiment, there is provided an apparatus, comprising: means for detecting, if an instruction is received to be a candidate for acting as a cluster head of a cluster of communication devices for a case that a communication device acting as the cluster head of the cluster disappears, the cluster being accessable, and the cluster enabling a device-to-device communication between the apparatus and at least one of the communication devices, means for monitoring, if the cluster head has disappeared; and means for configuring the apparatus to act as the cluster head of the cluster.

According to another embodiment, there is provided an apparatus, comprising: means for monitoring, if an instruction to act as a cluster head is received from a first cluster head of a cluster of communication devices, the cluster being accessible, and the cluster enabling a device-to-device communication and means for configuring to act as the cluster head of the cluster.

According to another embodiment, there is provided an apparatus, comprising: means for monitoring, if a cluster head of a cluster of communication devices has disappeared, the cluster being accessible, and the cluster enabling a device-to-device communication, and means for acting as a cluster head of the cluster.

According to another embodiment, there is provided an apparatus, comprising: means for detecting, if acting as a cluster head for a device-communication for a cluster of communication devices, wherein the cluster enables a device-to-device communication, means for monitoring, if a condition for disappearing as a cluster head is met, means for indicating the future disappearance as a cluster head, and means for inhibiting from acting as the cluster head.

According to another embodiment, there is provided an apparatus, comprising: means for performing a device-to-device communication with a communication device of first communication devices in a first cluster of the first communication devices with a first cluster head, wherein the first cluster enables the device-to-device communication, means for monitoring, if the apparatus obtains an access to a second cluster of second communication devices with a second cluster head, wherein the second cluster head is different from the first cluster head, and the second cluster enables the device-to-device communication between at least two of the second communication devices; and means for continuing the device-to-device communication with the communication device in the second cluster.

According to another embodiment, there is provided an apparatus, comprising: means for checking, if acting as a cluster head of a cluster of communication devices, wherein the cluster enables a device-to-device communication; means for broadcasting an operative status information signal, if the apparatus acts as the cluster head; and means for inhibiting the apparatus from broadcasting the operative status information signal, if the apparatus does not act as the cluster head.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; Additionally, embodiments may also apply wired technologies, e.g. IP based access technologies like cable networks or fixed lines.

a user device (also called UE, user equipment, user terminal, terminal device, communication device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor are software code independent and may be specified using any known or future developed programming language, such as a high-level programming language, such as objective-C, C, C++, C#, Java, etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units or means or in a distributed fashion, for example, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module comprising such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, comprising a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications may be made thereto, as defined by the appended claims.

The invention claimed is:

1. An apparatus, comprising at least one processor and at least one memory including a computer program code, the at least one memory and the computer program code configured to, with the at least one processor, cause the apparatus at least to:

monitor if a first cluster head of a first cluster of first communication devices has disappeared, wherein the apparatus has access to the first cluster enabling a device-to-device communication of the apparatus with at least one of the first communication devices; and, if it is monitored that the first cluster head has disappeared;

detect a second cluster head of a second cluster of second communication devices, wherein the second cluster head is different from the first cluster head, and the second cluster enables the device-to-device communication between at least two of the second communication devices;

check if a first channel is not occupied in the second cluster, wherein the first channel is allocated to the device-to-device communication of the apparatus in the first cluster; and request an access to the second cluster for the device-to-device communication, the first channel being indicated to the second cluster head with the request if the first channel is not occupied in the second cluster.

2. The apparatus according to claim 1, wherein the at least one processor and the at least one memory are further configured to cause the apparatus to:

check, if a second channel is not occupied in the second cluster, wherein the second channel is allocated to the device-to-device communication of the apparatus in the first cluster; and, if the second channel is occupied in the second cluster, prevent the apparatus from requesting the access to the second cluster.

3. The apparatus according to claim 1, wherein the at least one processor and the at least one memory are further configured to cause to:

evaluate if a fourth channel different from a third channel is sufficient for the device-to-device communication, wherein the third channel is allocated to the device-to-device communication of the apparatus in the first cluster, and the fourth channel is assigned to the device-to-device communication of the apparatus in an assignment received from the second cluster head; and if the fourth channel is not sufficient for the device-to-device communication of the apparatus, prevent the apparatus from requesting the access to the second cluster.

4. The apparatus according to claim 1, wherein the at least one processor and the at least one memory are further configured to cause the apparatus to:

configure the apparatus to act as a third cluster head of a third cluster of third communication devices, or request a replacement communication device of the first communication devices and different from the apparatus to act as the third cluster head of the third cluster, wherein in the third cluster, a fifth channel is allocated to the device-to-device communication of the apparatus, and the fifth channel is allocated to the device-to-device communication of the apparatus in the first cluster.

5. The apparatus according to claim 4, wherein the at least one processor and the at least one memory are further configured to cause the apparatus to, if the apparatus is configured to act as the third cluster head:

notify at least one of the first communication devices of the apparatus being configured to act as the third cluster head replacing the first cluster head.

6. The apparatus according to claim 1, wherein:

the causing the apparatus to monitor, if the first cluster head has disappeared, comprises causing the apparatus to monitor, if information indicating that the first cluster head has disappeared is received; and the at least one processor and the at least one memory are further configured to cause the apparatus to:

consider that the first cluster head has disappeared if the information is received.

7. The apparatus according to claim 1, wherein the causing the apparatus to monitor, if the first cluster head has disappeared, comprises causing the apparatus to monitor if, the following: an operative status information signal and a broadcast control channel, has been received from the first cluster head within a respective predefined period of time; and the at least one processor and the at least one memory are further configured to cause the apparatus to:

consider that the first cluster head has disappeared, if the at least one of the monitored operative status information signal and the monitored broadcast control channel has not been received within the respective predefined period of time.

8. A method, comprising:

monitoring if a first cluster head of a first cluster of first communication devices has disappeared, wherein an apparatus performing the method has access to the first cluster enabling a device-to-device communication of the apparatus with at least one of the first communication devices; and, if it is monitored that the first cluster head has disappeared;

detecting a second cluster head of a second cluster of second communication devices, wherein the second cluster head is different from the first cluster head, and the second cluster enables the device-to-device communication between at least two of the second communication devices;

checking if a first channel is not occupied in the second cluster, wherein the first channel is allocated to the device-to-device communication of the apparatus in the first cluster; and requesting an access to the second cluster for the device-to-device communication, the first channel being indicated to the second cluster head with the request if the first channel is not occupied in the second cluster.

9. The method according to claim 8, further comprising:
checking, if a second channel is not occupied in the second cluster, wherein the second channel is allocated to the device-to-device communication of the apparatus in the first cluster; and if the second channel is occupied in the second cluster, preventing the apparatus from requesting the access to the second cluster.

10. The method according to claim 8, further comprising:
evaluating if a fourth channel different from a third channel is sufficient for the device-to-device communication, wherein the third channel is allocated to the device-to-device communication of the apparatus in the first cluster, and the fourth channel is assigned to the device-to-device communication of the apparatus in an assignment received from the second cluster head; and, if the fourth channel is not sufficient for the device-to-device communication of the apparatus, preventing the apparatus from requesting the access to the second cluster.

11. The method according to claim 8, further comprising:
configuring the apparatus to act as a third cluster head of a third cluster of third communication devices, or requesting a replacement communication device of the first communication devices and different from the apparatus to act as the third cluster head of the third cluster, wherein in the third cluster, a fifth channel is allocated to the device-to-device communication of the apparatus, and the fifth channel is allocated to the device-to-device communication of the apparatus in the first cluster.

12. The method according to claim 11, further comprising, if the apparatus is configured to act as the third cluster head:

notifying at least one of the first communication devices of the apparatus being configured to act as the third cluster head replacing the first cluster head.

13. A non-transitory computer program product for a computer, comprising software code portions for performing the steps of:

monitoring if a first cluster head of a first cluster of first communication devices has disappeared, wherein an apparatus performing the method has access to the first cluster enabling a device-to-device communication of the apparatus with at least one of the first communication devices; and, if it is monitored that the first cluster head has disappeared;

detecting a second cluster head of a second cluster of second communication devices, wherein the second cluster head is different from the first cluster head, and the second cluster enables the device-to-device communication between at least two of the second communication devices;

checking if a first channel is not occupied in the second cluster, wherein the first channel is allocated to the device-to-device communication of the apparatus in the first cluster; and requesting an access to the second cluster for the device-to-device communication, the first channel being indicated to the second cluster head with the request if the first channel is not occupied in the second cluster; and wherein:

the computer program product comprises a computer-readable medium on which said software code portions are stored, and/or the computer program product is directly loadable into the internal memory of the computer and/or transmittable via a network via at least one of upload, download and push procedures.

\* \* \* \* \*